US012300177B2

(12) United States Patent
Zhang

(10) Patent No.: US 12,300,177 B2
(45) Date of Patent: May 13, 2025

(54) DISPLAY PANEL AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Mengmeng Zhang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/433,536

(22) Filed: Feb. 6, 2024

(65) Prior Publication Data

US 2024/0177672 A1 May 30, 2024

(30) Foreign Application Priority Data

Feb. 6, 2023 (CN) ......................... 202310099990.8

(51) Int. Cl.
*G09G 3/3233* (2016.01)

(52) U.S. Cl.
CPC ..... *G09G 3/3233* (2013.01); *G09G 2300/043* (2013.01); *G09G 2310/0286* (2013.01); *G09G 2310/062* (2013.01); *G09G 2310/08* (2013.01)

(58) Field of Classification Search
CPC ........... G09G 3/3233; G09G 2300/043; G09G 2310/0286; G09G 2310/062; G09G 2310/08
See application file for complete search history.

(56) References Cited

U.S. PATENT DOCUMENTS

2022/0199024 A1* 6/2022 Zhang .................. G09G 3/3233

FOREIGN PATENT DOCUMENTS

| | | |
|---|---|---|
| CN | 109461407 A | 3/2019 |
| CN | 113707090 A | 11/2021 |
| CN | 114038430 A | 2/2022 |

* cited by examiner

*Primary Examiner* — Afroza Chowdhury
(74) *Attorney, Agent, or Firm* — KDW Firm PLLC

(57) ABSTRACT

Provided are a display panel and a display device. The display panel comprises a display area, wherein the display area comprises a plurality of pixel circuits arranged in an array; each of the plurality of pixel circuits comprises a drive transistor and a reset module; the reset module is electrically connected to the gate of the drive transistor at a first node; the reset module comprises a first reset transistor and a second reset transistor; the first reset transistor and the second reset transistor are connected in series between a reset signal terminal and the first node; the gate of the first reset transistor is electrically connected to a first scan terminal, and the gate of the second reset transistor is electrically connected to a second scan terminal; wherein the channel type of the first reset transistor is different from the channel type of the second reset transistor.

22 Claims, 25 Drawing Sheets

DISPLAY PANEL AND DISPLAY DEVICE

CROSS-REFERENCE TO RELATED APPLICATION(S)

This application claims priority to Chinese Patent Application No. 202310099990.8 filed Feb. 6, 2023, the disclosure of which is incorporated herein by reference in its entirety.

TECHNICAL FIELD

The present disclosure relates to the field of display technologies and in particular, to a display panel and a display device.

BACKGROUND

Since the self-luminous display panel is usually provided with a light-emitting element, no backlight module that is used for providing light sources needs to be set. As a result, the self-luminous display panel has the characteristics of being light, thin and simple in structure and has become a research focus in the current display field.

The luminescence of the light-emitting element in the display panel needs to be driven by a corresponding drive transistor. Generally, a data signal is provided for the gate of the drive transistor, and then the drive transistor converts the data signal into a drive current and supplies the drive current to the light-emitting element to drive the light-emitting element to emit light.

However, when the light-emitting element emits light, the drive transistor is in a bias state, and especially in the low-frequency display mode, the drive transistor is in the bias state for a long time. In this manner, the threshold voltage of the drive transistor is drifted, and hysteresis occurs in the drive transistor, thereby causing the display smear and affecting the display effect of the display panel.

SUMMARY

The present disclosure provides a display panel and a display device to improve the display smear and improve the display effect of the display panel.

According to an aspect of the present disclosure, a display panel is provided. The display panel includes a display area; the display area includes a plurality of pixel circuits arranged in an array; each of the plurality of pixel circuits includes a drive transistor and a reset module.

The reset module is electrically connected to the gate of the drive transistor at a first node.

The reset module includes a first reset transistor and a second reset transistor; the first reset transistor and the second reset transistor are connected in series between a reset signal terminal and the first node; the gate of the first reset transistor is electrically connected to a first scan terminal, and the gate of the second reset transistor is electrically connected to a second scan terminal.

The channel type of the first reset transistor is different from the channel type of the second reset transistor; the duration of an effective pulse of a first scan signal of the first scan terminal is overlapped with durations of at least two effective pulses of a second scan signal of the second scan terminal.

According to another aspect of the present disclosure, a display device is provided. The display device includes the display panel described above.

It is to be understood that the contents described in this part are not intended to identify key or important features of the embodiments of the present disclosure and are not intended to limit the scope of the present disclosure. Other features of the present disclosure will become readily apparent from the description hereinafter.

BRIEF DESCRIPTION OF DRAWINGS

To illustrate solutions in embodiments of the present disclosure more clearly, the drawings used in the description of the embodiments will be briefly described below. Apparently, the drawings described below illustrate part of embodiments of the present disclosure, and those of ordinary skill in the art may obtain other drawings based on the drawings described below without any creative effort.

DETAILED DESCRIPTION

Figure 1:
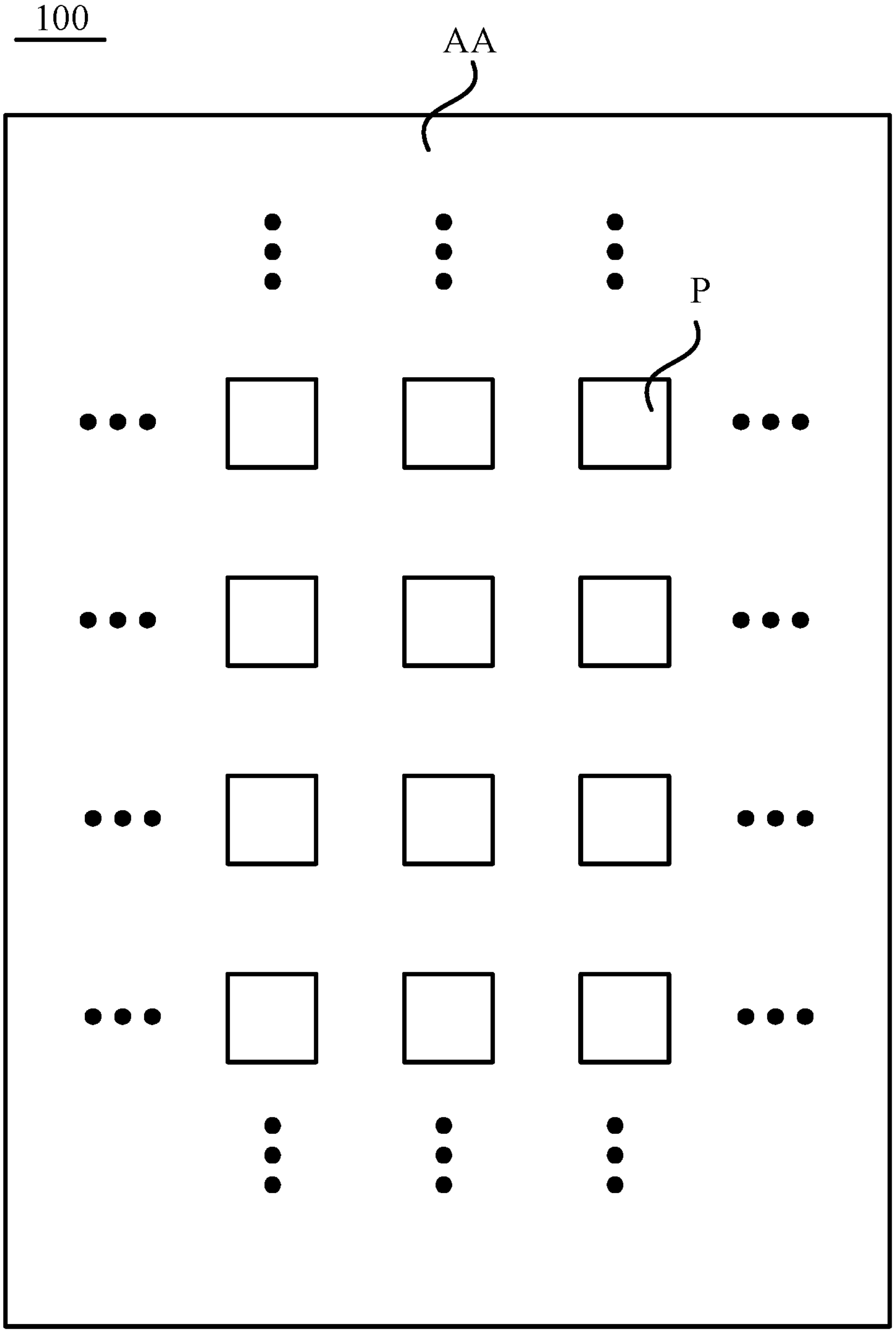
FIG. 1 is a structure diagram of a display panel according to an embodiment of the present disclosure.

The solutions in embodiments of the present disclosure will be described clearly and completely in conjunction with the drawings in the embodiments of the present disclosure from which the solutions will be better understood by those skilled in the art. Apparently, the embodiments described below are part, not all, of the embodiments of the present disclosure. Based on the embodiments described herein, all other embodiments obtained by those of ordinary skill in the art without any creative effort are within the scope of the present disclosure.

It is to be noted that the terms “first”, “second” and the like in the description, claims and drawings of the present disclosure are used to distinguish between similar objects and are not necessarily used to describe a particular order or sequence. It is to be understood that the data so used is interchangeable under appropriate circumstances such that the embodiments of the present disclosure described herein are capable of operation in sequences other than those illustrated or otherwise described herein. In addition, the terms “comprise”, “include” or any other variation thereof are intended to cover a non-exclusive inclusion, such that a process, method, system, article, or apparatus that contains a list of steps or units is not necessarily limited to those structures or units expressly listed herein but may include other structures or units not expressly listed or inherent to such process, method, article, or apparatus.

As described in the background, when the drive transistor in the pixel circuit is kept in the bias state for a long time, the hysteresis effect occurs in the drive transistor. In this manner, when the screen is switched, the data signal of the screen that is to be switched to cannot be accurately written to the gate of the drive transistor, and the drive transistor cannot generate an accurate drive current, thereby causing the smear on the displayed screen and affecting the display effect of the display panel.

To solve the preceding problems, an embodiment of the present disclosure provides a display panel. The display panel includes a display area. The display area includes a plurality of pixel circuits arranged in an array. Each pixel circuit includes a drive transistor and a reset module, and the reset module is electrically connected to the gate of the drive transistor at a first node. The reset module includes a first reset transistor and a second reset transistor, and the first reset transistor and the second reset transistor are connected in series between a reset signal terminal and the first node. The gate of the first reset transistor is electrically connected to a first scan terminal, and the gate of the second reset transistor is electrically connected to a second scan terminal. The channel type of the first reset transistor is different from the channel type of the second reset transistor. The duration of the effective pulse of the first scan signal of the first scan terminal is overlapped with durations of at least two effective pulses of the second scan signal of the second scan terminal.

In the preceding technical solution, when the first reset transistor and the second reset transistor that are different in channel type are set to be connected in series between the reset signal terminal and the first node, when the first reset transistor and the second reset transistor are simultaneously on, a reset signal of the reset signal terminal is controlled to be written to the first node to reset the gate of the drive transistor electrically connected to the first node. Further, when the duration of the effective pulse of the first scan signal received by the gate of the first reset transistor is set to be overlapped with durations of at least two effective pulses of the second scan signal received by the gate of the second reset transistor, the reset signal of the reset signal terminal resets the gate of the drive transistor at least twice within the overlapping duration of effective pulses of the first scan signal and the second scan signal. In this manner, the drive transistor is in a stable reset state, the data signal in the current drive cycle can be written to the gate of the drive transistor accurately, and the drive transistor can provide an accurate drive current according to the accurate data signal and drive the light-emitting element to emit light accurately, thereby improving the display smear and improving the display effect of the display panel.

The preceding is the core idea of the present disclosure. Based on the embodiments of the present disclosure, all other embodiments obtained by those of ordinary skill in the art without any creative effort are within the scope of the present disclosure. The technical solutions in the embodiments of the present disclosure are described clearly and completely hereinafter in conjunction with the drawings in the embodiments of the present disclosure.

Figure 2:
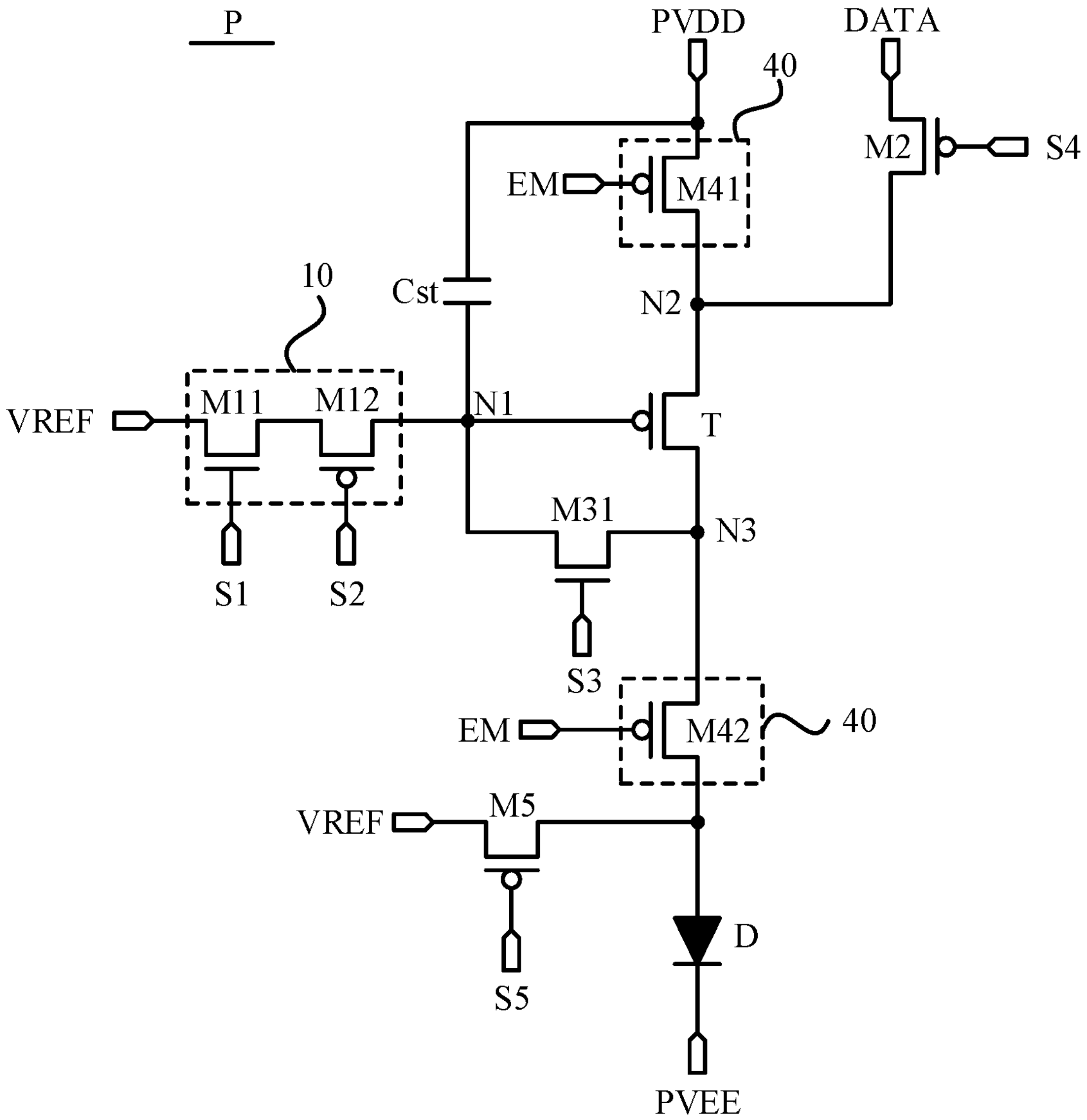
FIG. 2 is a structure diagram of a pixel circuit in a display panel according to an embodiment of the present disclosure.
Figure 3:
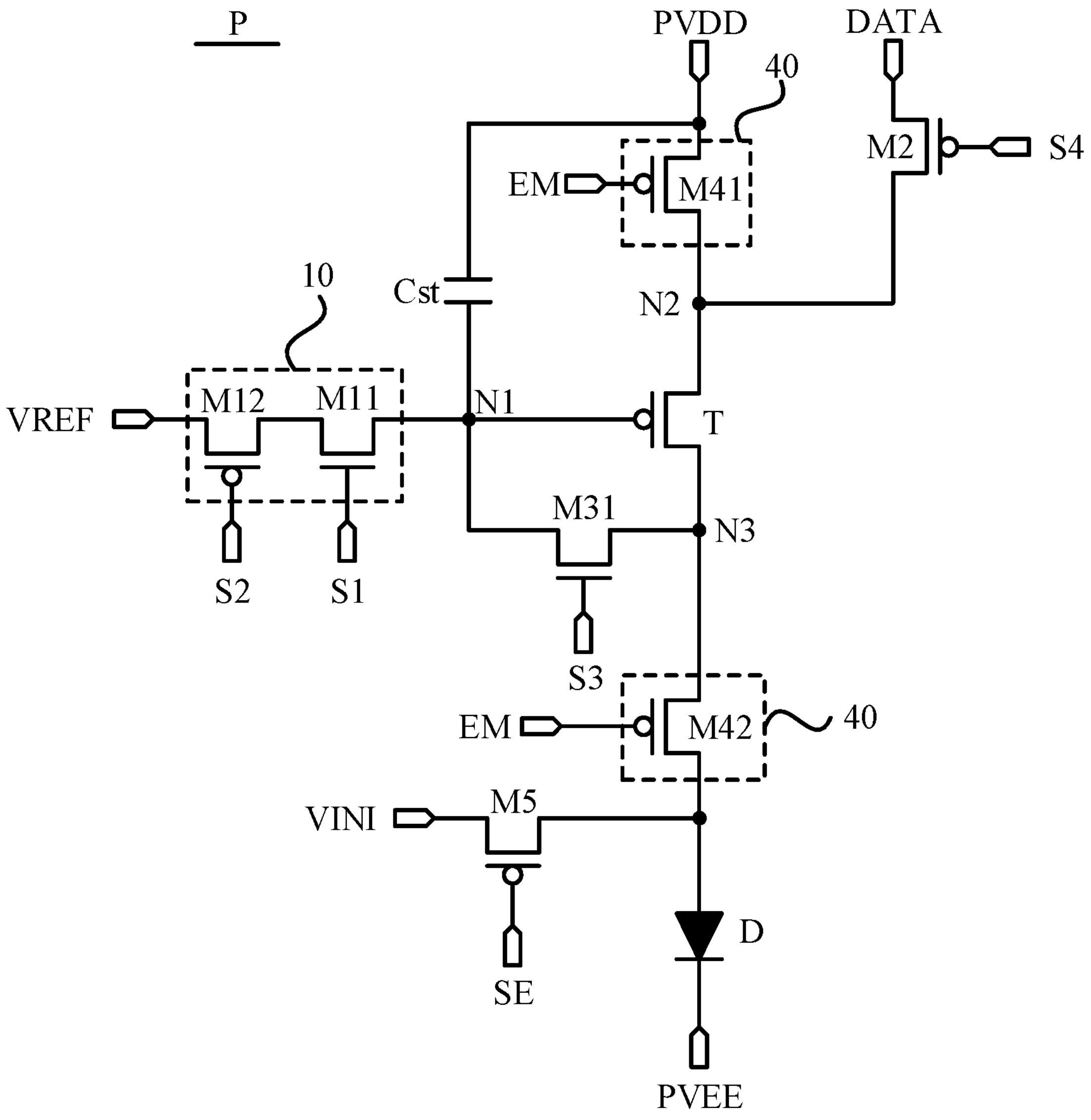
FIG. 3 is another structure diagram of a pixel circuit in a display panel according to an embodiment of the present disclosure.

FIG. 1 is a structure diagram of a display panel according to an embodiment of the present disclosure, FIG. 2 is a structure diagram of a pixel circuit in a display panel according to an embodiment of the present disclosure, and FIG. 3 is another structure diagram of a pixel circuit in a display panel according to an embodiment of the present disclosure. As shown in FIG. 1, the display panel 100 includes a display area AA, and the display area AA includes a plurality of pixel circuits P arranged in an array. As shown in FIG. 2 or FIG. 3, each pixel circuit P at least includes a drive transistor T and a reset module 10, and the reset module 10 is electrically connected to the gate of the drive transistor T at a first node N1. The reset module 10 includes a first reset transistor M11 and a second reset transistor M12, and the first reset transistor M11 and the second reset transistor M12 are connected in series between a reset signal terminal VREF and the first node N1. The gate of the first reset transistor M11 is electrically connected to a first scan terminal S1, and the gate of the second reset transistor M12 is electrically connected to a second scan terminal S2.

The setting that the first reset transistor M11 and the second reset transistor M12 are connected in series between the reset signal terminal VREF and the first node N1 may be understood as follows: as shown in FIG. 2, the first electrode of the first reset transistor M11 is electrically connected to the reset signal terminal VREF, the second electrode of the first reset transistor M11 is electrically connected to the first electrode of the second reset transistor M12, and the second electrode of the second reset transistor M12 is electrically connected to the first node N1; or as shown in FIG. 3, the first electrode of the second reset transistor M12 is electrically connected to the reset signal terminal VREF, the second electrode of the second reset transistor M12 is electrically connected to the first electrode of the first reset transistor M11, and the second electrode of the first reset transistor M11 is electrically connected to the first node N1.

With continued reference to FIG. 2 or FIG. 3, the channel type of the first reset transistor M11 is different from the channel type of the second reset transistor M12, the gate of the first reset transistor M11 is electrically connected to the first scan terminal S1, the gate of the second reset transistor M12 is electrically connected to the second scan terminal S2, the duration of the effective pulse of the first scan signal s1 of the first scan terminal S1 is overlapped with durations of at least two effective pulses of the second scan signal s2 of the second scan terminal S2.

The setting that the channel type of the first reset transistor M11 is different from the channel type of the second reset transistor M12 may specifically be as follows: when the first reset transistor M11 is an N-channel transistor, the second reset transistor M12 may be a P-channel transistor; at this point, when the first scan signal s1 of the first scan terminal S1 is at a high level, the first reset transistor M11 is on, and when the first scan signal s1 of the first scan terminal S1 is at a low level, the first reset transistor M11 is off; accordingly, when the second scan signal s2 of the second scan terminal S2 is at a high level, the second reset transistor M12 is off, and when the second scan signal s2 of the second scan terminal S2 is at a low level, the second reset transistor M12 is on. In this manner, the duration of the effective pulse of the first scan signal s1 is the duration in which the first scan signal s1 is at a high level, and the duration of the effective pulse of the second scan signal s2 is the duration in which the second scan signal s2 is at a low level.

In other optional embodiments, the first reset transistor may also be a P-channel transistor, and the second reset transistor also be an N-channel transistor; at this point, when the first scan signal of the first scan terminal is at a low level, the first reset transistor is on, and when the first scan signal of the first scan terminal is at a high level, the first reset transistor is off; similarly, when the second scan signal of the second scan terminal is at a high level, the second reset transistor is on, and when the second scan signal of the second scan terminal is at a low level, the second reset transistor is off. In this manner, the duration of the effective pulse of the first scan signal is the duration in which the first scan signal is at a low level, and the duration of the effective pulse of the second scan signal is the duration in which the second scan signal is at a high level.

It is to be understood that both the high level and the low level are relative level signals and do not represent the polarity of the signals, and the embodiments of the present disclosure do not limit the polarity and specific values of the high level and the low level as long as the core invention point of the embodiments of the present disclosure can be achieved.

For ease of description, unless otherwise specified, the technical solutions in the embodiments of the present disclosure are illustrated through the example in which the first reset transistor M11 is an N-channel transistor and the second reset transistor M12 is a P-channel transistor.

The material of the active layer of the N-type transistor may include, but is not limited to, an oxide semiconductor material such as indium gallium zinc oxide (IGZO), and the material of the active layer of the P-type transistor may include, but is not limited to, a low-temperature polysilicon (LTPS) material. In this manner, the P-channel transistor has relatively high mobility and the N-channel transistor has a relatively low off-leakage current. In this manner, as shown in FIG. 3, when the first reset transistor M11 is an N-channel transistor and the second reset transistor M12 is a P-channel transistor, the first electrode of the second reset transistor M12 may be electrically connected to the reset signal terminal VREF, the second electrode of the second reset transistor M12 is electrically connected to the first electrode of the first reset transistor M11, and the second electrode of the first reset transistor M11 is electrically connected to the first node N1. At this point, the N-channel first reset transistor M11 is directly electrically connected to the first node N1, that is, the N-channel first reset transistor M11 is directly electrically connected to the gate of the drive transistor T so that when the drive transistor T does not need to be reset and the first reset transistor M11 and the second reset transistor M12 are both in the off state, the leakage current between the node where the first reset transistor M11 is connected to the second reset transistor M12 and the gate of the drive transistor can be reduced, thereby ensuring the stability of the gate potential of drive transistor T. Further, even though the P-channel second reset transistor M12 has a large leakage current, when the second reset transistor M12 is in the off state, a large leakage current between the reset signal Vref of the reset signal terminal VREF and the node where the second reset transistor M12 is connected to the first reset transistor M11 cannot affect the gate potential of the drive transistor T due to the presence of the first reset transistor M11, thereby ensuring the stability of the gate potential of the drive transistor T.

Figure 4:
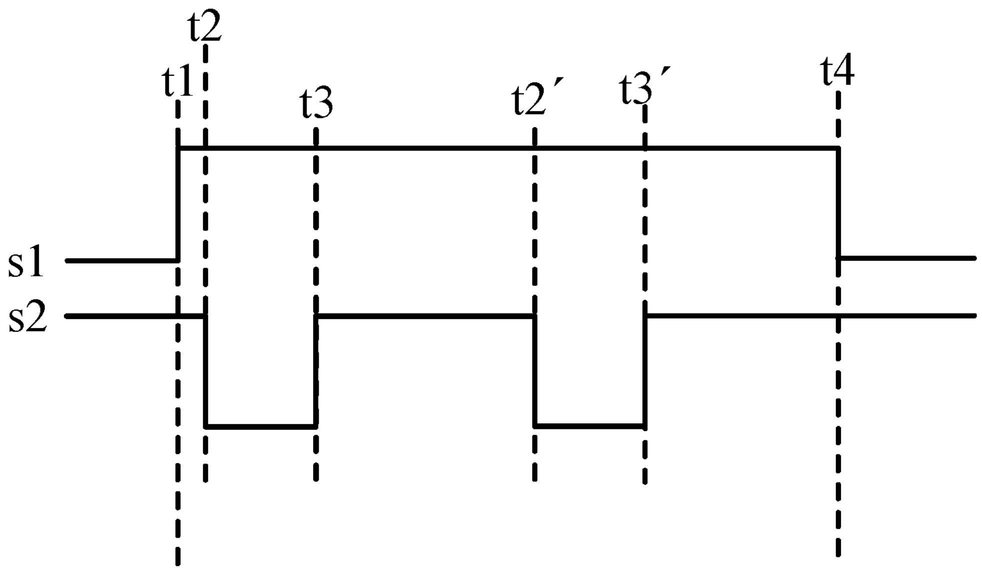
FIG. 4 is a drive timing diagram of a pixel circuit according to an embodiment of the present disclosure.

For example, FIG. 4 is a drive timing diagram of a pixel circuit according to an embodiment of the present disclosure. With reference to FIGS. 3 and 4, when both the first reset transistor M11 and the second reset transistor M12 are in the on state, the reset signal Vref of the reset signal terminal VREF can be transmitted to the first node N1 through the first reset transistor M11 and the second reset transistor in sequence; and when at least one of the first reset transistor M11 or the second reset transistors M12 is in the off state, the reset signal Vref of the reset signal terminal VREF cannot be transmitted to the first node N1. At this point, the second scan signal s1 of the second scan terminal S2 is also an effective pulse when the first scan signal s1 of the first scan terminal S1 is an effective pulse, and both the first reset transistor M11 and the second reset transistor M12 can be in the on state so that the reset signal Vref of the reset signal terminal VREF can be transmitted to the first node N1 through the first reset transistor M11 and the second reset transistor in sequence, that is, the reset signal Vref of the reset signal terminal VREF can be transmitted to the gate of the drive transistor T to reset the gate of the drive transistor T so that the drive transistor T is restored from a bias state in the previous drive cycle to a reset state. The bias state may be understood as the state in which the drive transistor T provides a drive current according to its gate potential, and the reset state may be understood as the state in which the gate potential of the drive transistor T no longer contains the data signal and the gate potential of the drive transistor T can maintain the drive transistor T in the on state in the subsequent writing process of the data signal.

Further, when the duration of the effective pulse of the first scan signal s1 of the first scan terminal S1 is overlapped with the durations of at least two effective pulses of the second scan signal s2 of the second scan terminal S2, the gate of the drive transistor T can be reset once within the duration in which the effective pulse of the first scan signal s1 is overlapped with each effective pulse of the second scan signal s2, and then the gate of the drive transistor T can be reset at least twice within the duration in which the first scan signal s1 is the effective pulse. In this manner, the data signal contained in the gate potential of the drive transistor T can be thoroughly cleared when the reset of the gate of the drive transistor T is finished, and the drive transistor T can be in a stable reset state, thereby facilitating the subsequent accurate writing of the data signal.

In the preceding embodiments of the present disclosure, the first reset transistor and the second reset transistor that are different in channel type are connected in series between the reset signal terminal and the first node so that when the first reset transistor and the second reset transistor are simultaneously on, a reset signal of the reset signal terminal is controlled to be written to the first node to reset the gate of the drive transistor electrically connected to the first node. Further, the duration of the effective pulse of the first scan signal received by the gate of the first reset transistor is overlapped with durations of at least two effective pulses of the second scan signal received by the gate of the second reset transistor so that within the overlapping duration of effective pulses of the first scan signal and the second scan signal, the reset signal of the reset signal terminal resets the gate of the drive transistor at least twice. In this manner, the drive transistor is in a stable reset state, the data signal in the current drive cycle can be written to the gate of the drive transistor accurately, and the drive transistor can provide an accurate drive current according to the accurate data signal and drive the light-emitting element to emit light accurately, thereby improving the display smear and improving the display effect of the display panel.

It is to be noted that in FIG. 4, illustratively, the duration of the effective pulse of the first scan signal s1 of the first scan terminal S1 is overlapped with durations of two effective pulses of the second scan signal s2 of the second scan terminal S2 in the same pixel circuit P. In the embodiments of the present disclosure, the duration of the effective pulse of the first scan signal s1 of the first scan terminal S1 may also be overlapped with durations of more than two (for example, three, four or five) effective pulses of the second scan signal s2 of the second scan terminal S1 in the same pixel circuit, and the embodiments of the present disclosure do not specifically limit the number of the preceding effective pulses of the second scan signal s2 as long as the core invention point of the embodiments of the present disclosure can be achieved. For ease of description, unless otherwise specified, the technical solutions in the embodiments of the present disclosure are illustrated through the example in which the duration of the effective pulse of the first scan signal of the first scan terminal is overlapped with durations of two effective pulses of the second scan signal of the second scan terminal in the same pixel circuit.

Optionally, with continued reference to FIGS. 3 and 4, in the same pixel circuit P, the start time t1 of the effective pulse of the first scan signal s1 is before the start time t2 of the first one effective pulse of the second scan signal s2, and the end time t4 of the effective pulse of the first scan signal s1 is after the end time t3' of the last one effective pulse of the second scan signal s2.

It is to be understood that the duration in which the display panel displays one frame of a screen is equal to one drive cycle of one pixel circuit P. Within one drive cycle of the pixel circuit P, the first scan signal s1 of the first scan terminal S1 may include one effective pulse; the start time t2 of the effective pulse of the first scan signal s1 is the time when the first scan signal s1 changes from a low level to a high level, and the end time t4 of the effective pulse of the first scan signal s1 is the time when the first scan signal s1 changes from a high level to a low level. Similarly, within one drive cycle of the pixel circuit P, the second scan signal s2 of the second scan terminal S2 may include at least two effective pulses; the start time t2 of the first one effective pulse of the second scan signal s2 is the time when the second scan signal s2 jumps from a high level to a low level for the first time, and the end time t3 of the first one effective pulse of the second scan signal s2 is the time when the second scan signal s2 jumps from a low level to a high level for the first time; the start time t2' of the last one effective pulse of the second scan signal s2 is the time when the second scan signal s2 jumps from a high level to a low level for the last time, and the end time t3' of the last one effective pulse of the second scan signal s2 is the time when the second scan signal s2 jumps from a low level to a high level for the last time.

In the same pixel circuit P, when the start time t1 of the effective pulse of the first scan signal s1 is set to be before the start time t2 of the first one effective pulse of the second scan signal s2, the turn-on time of the first reset transistor M11 controlled by the first scan signal s1 can be before the first turn-on time of the second reset transistor M12 controlled by the second scan signal s2; when the end time t4 of the effective pulse of the first scan signal s1 is set to be after the end time t3 of the last one effective pulse of the second scan signal s2, the turn-off time of the first reset transistor M11 controlled by the first scan signal s1 can be after the turn-off time of the second reset transistor M12 controlled by the second scan signal s2. In this manner, the first reset transistor M11 is in the on state within the duration in which the second reset transistor M12 is on, the reset signal Vref of the reset signal terminal VREF can be written to the first node N1 through the first reset transistor M11 and the second reset transistor M12, and the duration in which the reset signal Vref is written to the first node N1 can be controlled by the duration of the effective pulse of the second scan signal s2 so that when the first scan signal s1 is the effective pulse the reset signal Vref can be provided for the first node N1 at least twice to reset the gate of the drive transistor T at least twice.

It is to be understood that since the width and number of the effective pulse of the first scan signal s1 are different from the width and number of the effective pulse of the second scan signal s2, different scan circuits need to be set to provide the first scan signal s1 and the second scan signal s2 for pixel circuits P, respectively.

Figure 5:
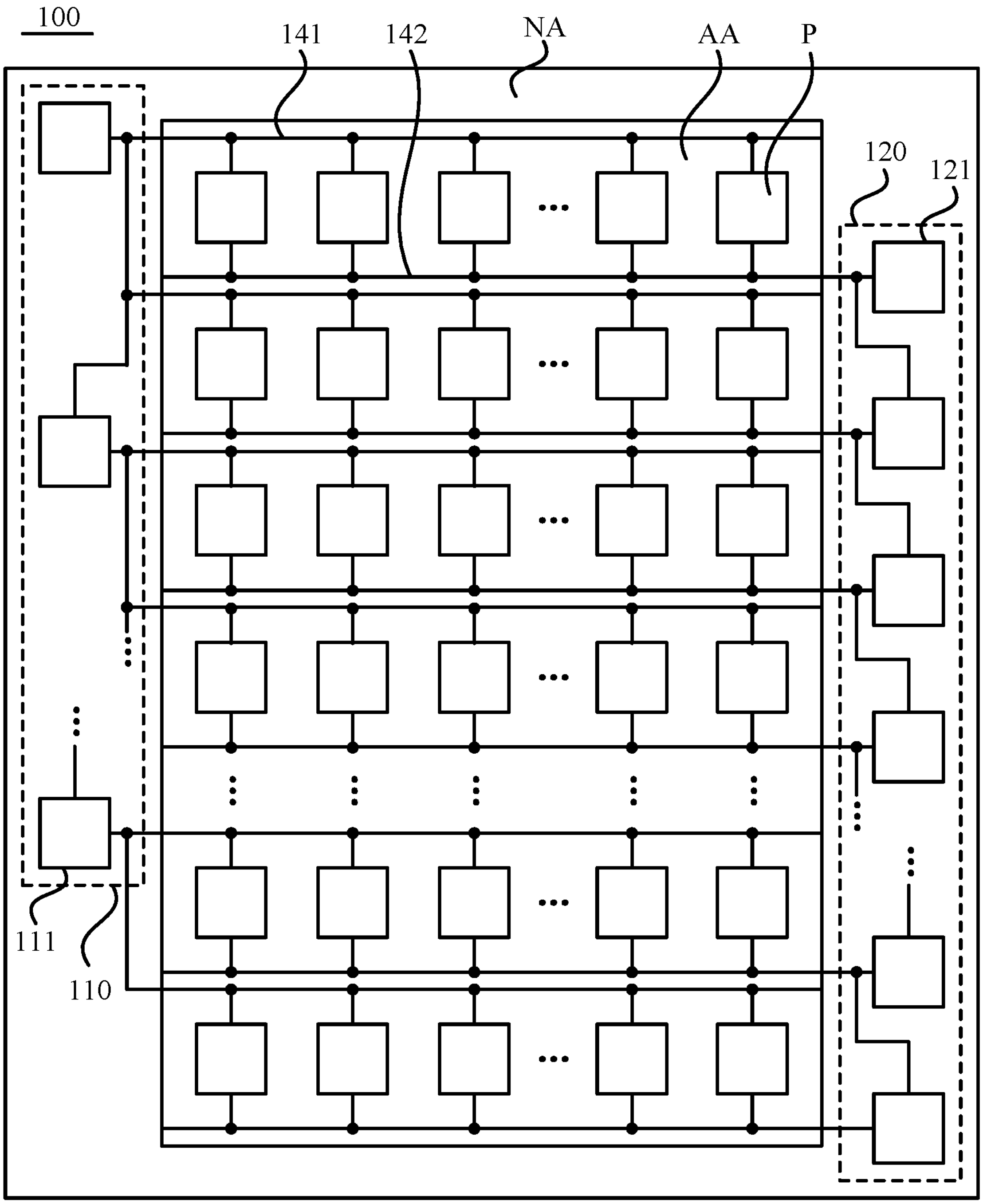
FIG. 5 is another structural diagram of a display panel according to an embodiment of the present disclosure.

Optionally, FIG. 5 is another structural diagram of a display panel according to an embodiment of the present disclosure. With reference to FIGS. 3 and 5, the display area AA further includes a plurality of first scan lines 141 and a plurality of second scan lines 142. First scan terminals S1 of at least part of pixel circuits P in the same row are electrically connected to the same first scan line 141, and second scan terminals S2 of at least part of pixel circuits P in the same row are electrically connected to the same second scan line 142. At this point, the first scan line 141 can transmit the first scan signal s1 to the first scan terminal S1 of each pixel circuit P electrically connected to the first scan line 141 so that the first scan signal s1 controls the on or off of the first reset transistor M11 in each pixel circuit P; the second scan line 142 can transmit the second scan signal s2 to the second scan terminal S2 of each pixel circuit P electrically connected to the second scan line 142 so that the second scan signal s2 controls the on or off of the second reset transistor M12 in each pixel circuit P.

The first scan terminals S1 of at least part of pixel circuits P in the same row are electrically connected to the same first scan line 141, that is, the first scan terminals S1 of part or all of the pixel circuits P in the same row are electrically connected to the same first scan line 141. Accordingly, the second scan terminals S2 of at least part of pixel circuits P in the same row are electrically connected to the same second scan line 142, that is, the second scan terminals S2 of part or all of the pixel circuits P in the same row are electrically connected to the same second scan line 142. The embodiments of the present disclosure do not specifically limit the case where the pixel circuits P in the same row share the first scan line 141 and the second scan line 142 as long as the core invention point of the embodiments of the present disclosure can be achieved. For ease of description, unless otherwise specified, the technical solutions in the embodiments of the present disclosure are illustrated through the example in which all of the pixel circuits P in the same row are electrically connected to the same first scan line and the second scan line 142, respectively.

With reference to FIGS. 2, 4, and 5, the display panel 100 further includes a non-display area NA surrounding the display area AA. The non-display area NA includes a first scan circuit 110 and a second scan circuit 120. The first scan circuit 110 includes a plurality of cascaded first scan units 111, and the second scan circuit 120 includes a plurality of cascaded second scan units 121. Each stage of first scan unit 111 is electrically connected to adjacent N first scan lines 141, and each stage of first scan unit 111 is used for providing a first scan signal s1 for each of the adjacent N first scan lines 141. Each effective pulse of the first scan signal s1 outputted by each stage of first scan unit 111 is sequentially shifted, and the shift amount of the effective pulse of the first scan signal 111 at each stage is less than the width of the effective pulse of the first scan signal s1. Each stage of second scan unit 121 is electrically connected to a respective one of the plurality of second scan lines 142. The effective pulse of the second scan signal s2 outputted by each stage of second scan unit 121 is sequentially shifted, and the shift amount of the effective pulse of the second scan signal s2 outputted by each stage of second scan unit 121 is greater than or equal to the width of the effective pulse of the second scan signal s2. N is a positive integer greater than or equal to 2.

It is to be understood that each first scan unit 111 may include a signal input terminal and a signal output terminal. At this point, the signal input terminal of the first stage of first scan unit 111 receives a start pulse signal, and for the remaining stages of first scan units 111, the signal input terminal of each stage of first scan unit 111 is electrically connected to the signal output terminal of the previous stage of first scan unit 111. For example, the signal input terminal of the second stage of first scan unit 111 is electrically connected to the signal output terminal of the first stage of first scan unit 111, and the signal input terminal of the third stage of first scan unit 111 is electrically connected to the signal output terminal of the second stage of first scan unit 111. Similarly, each second scan unit 121 may include a signal input terminal and a signal output terminal. At this point, the signal input terminal of the first stage of second scan unit 121 receives a start pulse signal, and for the remaining stages of second scan units 121, the signal input terminal of each stage of second scan unit 121 is electrically connected to the signal output terminal of the previous stage of second scan unit 121. For example, the signal input terminal of the second stage of second scan unit 121 is electrically connected to the signal input terminal of the first stage of second scan unit 121, and the signal input terminal of the third stage of second scan unit 121 is electrically connected to the signal input terminal of the second stage of second scan unit 121. The signal output terminal of each stage of first scan unit 111 is used for outputting the first scan signal s1, and the signal output terminal of second scan unit 121 is used for outputting the second scan signal s2.

Each stage of first scan unit 111 is electrically connected to the adjacent N first scan lines 141 so that the pixel circuits P electrically connected to these adjacent N first scan lines 141 share the same first scan unit 111. In this manner, no first scan unit 111 needs to be set for each pixel circuit P electrically connected to each first scan line 141, thereby reducing the number of first scan circuits 111 set in the first scan circuit 110. Since the first scan circuit 110 is set in the non-display area NA of the display panel 100, the structure of the display panel 100 can be simplified when the number of first scan units 111 set in the first scan circuit 110 is small, thereby reducing the size of the non-display area NA and achieving the narrow bezel of the display panel 100. Further, the effective pulse of the first scan signal s1 outputted by each stage of first scan unit 111 is sequentially shifted, and the shift amount of the effective pulse of the first scan signal s1 outputted by each stage of first scan unit 111 is less than the width of the effective pulse of the first scan signal s1, that is, durations of effective pulses of the first scan signals s1 outputted by adjacent two or more cascaded first scan units 111 are overlapped. Compared with the case where durations of effective pulses of the first scan signals s1 outputted by adjacent two or more cascaded first scan units 111 are not overlapped, the preceding setting can effectively shorten the duration between the start time of the effective pulse of the first scan signal s1 outputted by the first stage of first scan unit 111 and the end time of the effective pulse of the first scan signal s1 outputted by the last stage of first scan unit 111, the duration for resetting the drive transistor T in each pixel circuit P is shortened, and the reset duration of each drive transistor T when the drive cycle of the pixel circuit P is fixed is shortened, thereby extending the duration of the light emission phase of each pixel circuit P. Since the display brightness of the display panel 100 is related to the integration of time by the human eye, that is, the longer the time, the larger the integration value and the stronger the display brightness of the display panel 100 perceived by the human eye, when the duration of the light emission phase is extended, the display brightness of the display panel 100 is improved, thereby improving the display effect of the display panel.

It is to be noted that in FIG. 5, illustratively, each stage of first scan unit 111 is electrically connected to two second scan lines 141, that is, N is equal to 2. In the embodiments of the present disclosure, the value of N may be any positive integer greater than or equal to 2, that is, the number of second scan lines 141 electrically connected to each stage of second scan unit 111 may be two, three or more and may be set according to actual needs, and the embodiments of the present disclosure do not specifically limit the value of N.

Further, each stage of second scan unit 121 is electrically connected to one second scan line 142 so that pixel circuit Ps which are electrically connected to the same second scan line 121 and are located in the same row share the same second scan unit 121. The effective pulse of the second scan signal s2 outputted by each stage of the second scan unit 121 is sequentially shifted, and the shift amount of the effective pulse of the second scan signal s2 outputted by each stage of second scan unit 121 is greater than or equal to the width of the effective pulse of the second scan signal s2. At this point, durations of the effective pulses of the second scan signals s2 outputted by any adjacent N stages of second scan units 121 may not be overlapped each other so that the second reset transistors M12 in pixel circuits P that each are electrically connected to a respective one of successive N stages of second scan units 21 and are located in different rows are not simultaneously on. In this manner, although the first scan signal s1 outputted by each stage of first scan unit 111 can control the first reset transistors M11 in pixel circuits P that are electrically connected to N first scan lines 142 to be simultaneously on, since the reset signal Vref of the reset signal terminal VREF is written to the first node N1 only when both the first reset transistor M11 and the second reset transistor M12 are simultaneously on, the drive transistors T in pixel circuits P in different rows can be reset at different times when the second reset transistors M12 of the pixel circuits P in different rows are not simultaneously on.

It is to be noted that in FIG. 5, illustratively, the first scan circuit 110 and the second scan circuit 120 are located on opposite sides of the display area AA respectively so that the sizes of the non-display area NA on opposite sides of the display area AA are consistent, thereby improving the overall aesthetics of the display panel. In other embodiments of the present disclosure, the first scan circuit 110 and the second scan circuit 120 may also be set on the same side of the display area AA or the first scan circuit 110 and the second scan circuit 120 may also be set on the adjacent sides of the display area AA. The embodiments of the present disclosure do not limit the specific manner in which the first scan circuit 110 and the second scan circuit 120 are set as long as the core invention point of the embodiments of the present disclosure can be achieved.

Figure 6:
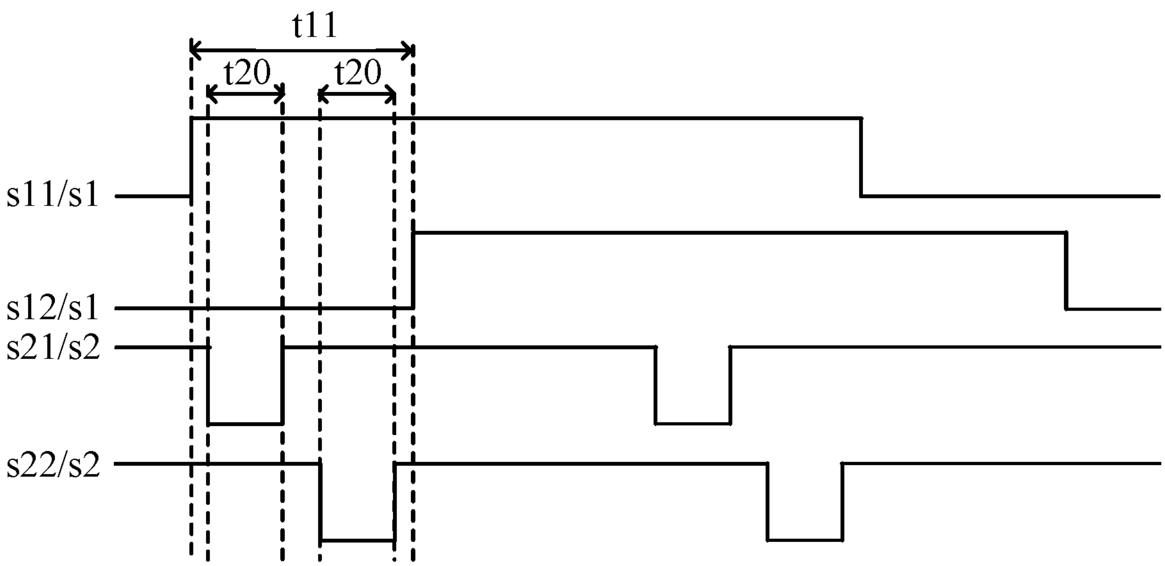
FIG. 6 is a drive timing diagram of each pixel circuit in a display panel according to an embodiment of the present disclosure.

In an optional embodiment, FIG. 6 is a drive timing diagram of each pixel circuit in a display panel according to an embodiment of the present disclosure. With reference to FIGS. 3, 5 and 6, the interval duration between start times of effective pulses of first scan signals s1 outputted by adjacent two stages of first scan units 111 is a first duration t11. In successive N stages of second scan units 121, the effective pulse of the second scan signal s2 outputted by each stage of second scan unit 121 is sequentially shifted, and the duration of the effective pulse of the second scan signal s2 outputted by each stage of second scan unit 121 is not overlapped. The total duration of the first one effective pulse of the second scan signal s2 outputted by each stage of second scan unit 121 among the successive N stages of second scan units 121 is a second duration N*t20. The first duration t11 is greater than or equal to the second duration N*t20.

For example, the following is described using an example in which N is equal to 2, that is, one first scan unit 111 is electrically connected to the first scan terminals S1 of adjacent two rows of pixel circuits P through adjacent two first scan lines 141, and the second scan terminals S2 of these two rows of pixel circuits P are electrically connected to two second scan units 121 through two second scan lines 142, respectively. For example, the first scan terminal S1 of each of pixel circuits P in the first and second rows is electrically connected to the first stage of first scan unit 111 through two first scan lines 141, respectively, and the first scan terminal S1 of each of pixel circuits P in the third and fourth rows is electrically connected to the second stage of first scan unit 111 through two other first scan lines 141, respectively. The second scan terminal S2 of each of pixel circuits P in the first row is electrically connected to the first stage of second scan unit 121 through one second scan line 142, and the second scan terminal S2 of each of pixel circuits P in the second row is electrically connected to the second stage of second scan unit 121 through another second scan line 142. At this point, the effective pulse of the first scan signal s11 outputted by the first stage of first scan unit 111 is shifted by a certain shift amount from the effective pulse of the first scan signal s12 outputted by the second stage of first scan unit 111, and the shift amount is the first duration t11. In this manner, when the duration in which the first stage of first scan unit 111 outputs the effective pulse of the first scan signal s11 reaches t11, the second stage of first scan unit 111 starts to output the effective pulse of the first scan signal s12. The second scan unit 121 outputs each effective pulse of the second scan signal s2 at a duration t20. At this point, the sum of the duration t20 in which the first stage of second scan unit 121 outputs the first one effective pulse of the second scan signal s21 and the duration t20 in which the second stage of second scan unit 121 outputs the first one effective pulse of the second scan signal s22 is the second duration 2*t12. Since the first duration t11 is greater than or equal to the duration time 2*t20, before the second stage of first scan unit 111 starts to output the effective pulse of the first scan signal s12, the drive transistor T of each of pixel circuits P electrically connected to the first stage of first scan unit 111 can be reset at least once so that pixel circuits P electrically connected to different first scan units 111 can be reset at different time periods. Further, since in successive N stages of second scan units 121, the effective pulse of the second scan signal s2 outputted by each stage of second scan unit 121 is sequentially shifted and the duration in which each stage of second scan unit 121 outputs the effective pulse of the second scan signal s2 is not overlapped, the drive transistors T of pixel circuits P in different rows can be reset at different time periods. Therefore, the drive transistors T of pixel circuits P in different rows can be prevented from being reset simultaneously, and the normal working process of the display panel cannot be affected, thereby ensuring that the display panel normally displays and emits light.

Optionally, with continued reference to FIG. 3, each pixel circuit P further includes a data write transistor M2 and a first compensation transistor M31. The gate of the first compensation transistor M31 is electrically connected to a third scan terminal S3, the first electrode of the first compensation transistor M31 is coupled to the second electrode of the drive transistor T at a third node N3, and the second electrode of the first compensation transistor M31 is coupled to the gate of the drive transistor T at the first node N1. The gate of the data write transistor M2 is electrically connected to a fourth scan terminal S4, the first electrode of the data write transistor M2 is connected to a data signal terminal DATA, and the second electrode of the data write transistor M2 is electrically connected to the first electrode of the drive transistor T at a second node N2. In the same pixel circuit P, the duration of the effective pulse of the third scan signal s3 of the third scan terminal S3 is overlapped with the duration of the effective pulse of the fourth scan signal s4 of the fourth scan terminal S4.

The channel type of the data write transistor M2 may be the same as or different from the channel type of the first compensation transistor M31 and the embodiments of the present disclosure do not specifically limit the channel type of both. In an optional embodiment, the channel type of the data write transistor M2 may be different from the channel type of the first compensation transistor M31; that is, when the data write transistor M2 is a P-channel transistor, the first compensation transistor M31 is an N-channel transistor, or when the data write transistor M2 is an N-channel transistor, the first compensation transistor M31 is a P-channel transistor.

It is to be understood that if the first compensation transistor M31 is an N-channel transistor, when the third scan signal s3 of the third scan terminal S3 is at a low level, the first compensation transistor M31 is off, and when the third scan signal s3 of the third scan terminal S3 is at a high level, the first compensation transistor M31 is on. At this point, the duration in which the third scan signal s3 is at a high level is the duration of the effective pulse of the third scan signal s3. If the first compensation transistor M31 is a P-channel transistor, the first compensation transistor M31 is on under the control of the low level of the third scan signal s3, and the first compensation transistor M31 is off under the control of the high level of the third scan signal s3. At this point, the duration in which the third scan signal s3 is at a low level is the duration of the effective pulse of the third scan signal s3.

Accordingly, if the data write transistor M2 is a P-channel transistor, when the fourth scan signal s4 of the fourth scan terminal S4 is at a high level, the data write transistor M2 is off, and when the fourth scan signal s4 of the fourth scan terminal S4 is at a low level, the data write transistor M2 is on. At this point, the duration in which the fourth scan signal s4 is at a low level is the duration of the effective pulse of the fourth scan signal s4. If the data write transistor M2 is an N-channel transistor, the data write transistor M2 is on under the control of the high level of the fourth scan signal s4, and the data write transistor M2 is off under the control of the low level of the fourth scan signal s4. At this point, the duration in which the fourth scan signal s4 is at a high level is the duration of the effective pulse of the fourth scan signal s4.

The duration of the effective pulse of the third scan signal s3 of the third scan terminal S3 is overlapped with the duration of the effective pulse of the fourth scan signal s4 of the fourth scan terminal S4 so that the data write transistor M2 and the first compensation transistor M31 can be in the on state simultaneously within the overlapping duration, and at this point, the data signal Vdata of the data signal terminal DATA can be transmitted to the second node N2 through the data write transistor M2 that is on. If the drive transistor T is also in the on state at this point, the drive transistor T can transmit the data signal Vdata to the third node N3 and then to the gate of the drive transistor T through the first compensation transistor M31 that is on.

It is to be understood that since the drive transistor T needs to be in the on state when the data signal Vdata of the data signal terminal DATA is written to the gate of the drive transistor T, the gate of the drive transistor T may be reset through the reset signal Vref of the reset signal terminal VREF before the data signal is written to the gate of the drive transistor T. In this manner, when the data signal Vdata is written to the gate of the drive transistor T, the difference between the gate potential of the drive transistor T and the first electrode potential of the drive transistor T enables the drive transistor T to be in the on state. Therefore, the reset phase in which the gate of the drive transistor T is reset using the reset signal Vref of the reset signal terminal VREF is before the write phase in which the data signal is written to the gate of the drive transistor T. At this point, the duration of at least one effective pulse of the second scan signal s2 for controlling the on or off of the second reset transistor M12 is before the overlapping duration of the effective pulse of the third scan signal s3 and the effective pulse of the fourth scan signal s4. In an optional embodiment, durations of at least two effective pulses of the second scan signal s2 are before the overlapping duration of the effective pulse of the third scan signal s3 and the effective pulse of the fourth scan signal s4 so that the data signal Vdata can be written after the gate of the drive transistor T is reset at least twice. In this manner, the gate potential of the drive transistor T can maintain the drive transistor T in the on state in the write phase of the data signal Vdata, thereby ensuring the accurate writing of the data signal Vdata of the data signal terminal DATA.

Further, the gate potential of the drive transistor T is consistent with the reset signal Vref of the reset signal terminal VREF before the data signal Vdata is written to the gate of the drive transistor T and after the gate of the drive transistor T is reset. As the data signal Vdata is written, the gate potential of the drive transistor T gradually changes until the potential between the gate potential of the drive transistor T and the first electrode potential of the drive transistor T is equal to a threshold voltage Vth of the drive transistor T, and the critical turn-on condition of the drive transistor T is reached. At this point, the gate potential of the drive transistor T is Vdata+Vth at the end of the write phase of the data signal Vdata. In this manner, after the write phase of the data signal Vdata is finished, the drive current provided by the drive transistor T according to its gate potential may be independent of its threshold voltage.

In an optional embodiment, with continued reference to FIG. 3, each pixel circuit P may further include a light emission control module 40 and a light-emitting element D. In the same pixel circuit P, the light emission control module 40, the drive transistor T and the light-emitting element D are connected in series between a positive power supply terminal PVDD and a negative power supply terminal PVEE. The light emission control module 40 can control the duration in which the positive power supply terminal PVDD and the negative power supply terminal PVEE form a current path, that is, the drive transistor T provides a drive current for the light-emitting element D according to its gate potential to control the duration in which the light-emitting element D emits light.

In an example embodiment, the light emission control transistor 40 may include a first light emission control transistor M41 and a second light emission control transistor M42. In the same pixel circuit P, when the channel types of the first light emission control transistor M41 and the second light emission control transistor M42 are the same, the gates of the first light emission control transistor M41 and the second light emission control transistor M41 can both be electrically connected to the same light emitting control terminal EM. The first electrode of the first light emission control transistor M41 is electrically connected to the positive power supply terminal PVDD, and the second electrode of the first light emission control transistor M41 is electrically connected to the first electrode of the drive transistor T at the second node N2. The second light emission control transistor M42 is electrically connected to the second electrode of the drive transistor T at the third node N3, the second light emission control transistor M42 is electrically connected to the anode of the light-emitting element D, and the cathode of the light-emitting element D is electrically connected to the negative power supply terminal PVEE. The duration of the effective pulse of the light emission control signal Em of the light emission control terminal EM is not overlapped with the duration of the effective pulse of the first scan signal s1, the duration of the effective pulse of the second scan signal s2, the duration of the effective pulse of the third scan signal s2 and the duration of the effective pulse of the fourth scan signal s4.

It is to be understood that the channel types of the first light emission control transistor M41 and the second light emission control transistor M42 are the same, that is, the first light emission control transistor M41 and the second light emission control transistor M42 are both N-channel transistors or P-channel transistors. If the first light emission control transistor M41 and the second light emission control transistor M42 are both N-channel transistors, when the light emission control signal Em of the light emission control terminal EM is at a high level, the first light emission control transistor M41 and the second light emission control transistor M42 are simultaneously on, and when the light emission control signal Em of the light emission control terminal EM is at a low level, the first light emission control transistor M41 and the second light emission control transistor M42 are simultaneously off. At this point, the duration of the effective pulse of the light emission control signal Em is the duration in which the light emission control signal Em is at a high level. If the first light emission control transistor M41 and the second light emission control transistor M42 are both P-channel transistors, when the light emission control signal Em of the light emission control terminal EM is at a low level, the first light emission control transistor M41 and the second light emission control transistor M42 are simultaneously on, and when the light emission control signal Em of the light emission control terminal Em is at a high level, the first light emission control transistor M41 and the second light emission control transistor M42 are simultaneously off. At this point, the duration of the effective pulse of the light emission control signal Em is the duration in which the light emission control signal Em is at a low level. The embodiments of the present disclosure do not specifically limit the channel types of the first light emission control transistor M41 and the second light emission control transistor M42 as long as the core invention point of the embodiments of the present disclosure can be achieved.

Figure 7:
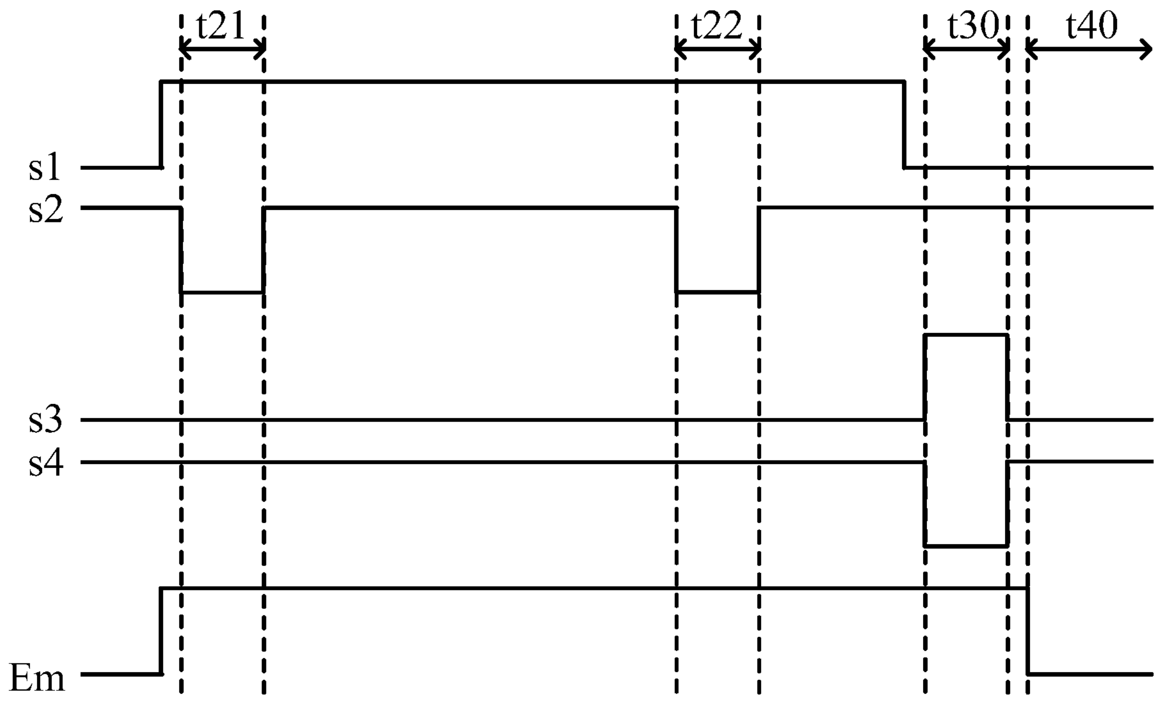
FIG. 7 is another drive timing diagram of a pixel circuit according to an embodiment of the present disclosure.

For example, the following is described using an example in which the first reset transistor M11 and the first compensation transistor M31 are N-channel transistors and the second reset transistor M12, the data write transistor M2, the first light emission control transistor M41, the second light emission control transistor M42 and the drive transistor T are all P-channel transistors. FIG. 7 is another drive timing diagram of a pixel circuit according to an embodiment of the present disclosure. With reference to FIGS. 3 and 7, the drive cycle of each pixel circuit P includes two reset phases t21 and t22, one write phase t30 and one light emission phase t40. After the last drive cycle of the pixel circuit P ends, the light emission control signal Em jumps from a low-level effective pulse to a high-level effective pulse, and the first scan signal s1 jumps from a low-level effective pulse to a high-level effective pulse.

In the first reset phase t21 of the current drive cycle, the first scan signal s1 is a high-level effective pulse, the second scan signal s2 is a low-level effective pulse, and the first reset transistor M11 and the second reset transistor M12 are simultaneously on. The reset signal of the reset signal terminal VREF is transmitted to the first node N1 through the first reset transistor M11 and the second reset transistor M12 that are on to reset the gate of the drive transistor T electrically connected to the first node N1 for the first time. After the first reset phase t21 of the pixel circuit P is finished, the first scan signal s1 of the pixel circuit P remains as a high-level effective pulse, and the second scan signal s2 jumps to a high level so that the second reset transistor M12 of the pixel circuit P is off.

In the second reset phase t22, the first scan signal s1 remains as a high-level effective pulse, the second scan signal s2 jumps again to a low-level effective pulse, and the first reset transistor M11 and the second reset transistor M12 are simultaneously on to reset the gate of the drive transistor T again. The reset signal Vref is provided for the gate of the drive transistor T again, and the drive transistor T is restored to the reset state to prevent the drive transistor T from not being restored to the reset state from the bias state of the previous drive cycle after the first reset. After the gate of the drive transistor T is reset twice, the potential of the first node N1 is consistent with the reset signal Vref so that the potential difference between the gate potential of the drive transistor T and the potential of the data signal corresponding to any display brightness can satisfy the condition under which the drive transistor T is accurately on.

In the write phase t30, the first scan signal s1 is at a low level, the second scan signal s2 is at a high level, and the first reset transistor M11 and the second reset transistor M12 are off. The third scan signal s3 is a high-level effective pulse, the fourth scan signal s4 is a low-level effective pulse, and the data write transistor M2 and the first compensation transistor M31 are on. The data signal Vdata of the data signal terminal DATA is transmitted to the second node N2 through the data write transistor M2 that is on to enable the first electrode potential of the drive transistor T to be equivalent to the voltage of the data signal Vdata. Since after the second reset phase t22, the gate potential of the drive transistor T is equivalent to the voltage of the reset signal Vref so that the potential difference between the gate of the drive transistor T and its first electrode is Vdata-Vref, and the drive transistor T is in the on state. The data signal Vdata continues to be transmitted to the third node N3 through the drive transistor T that is on and then transmitted to the gate of the drive transistor T through the first compensation transistor M31 electrically connected between the third node N3 and the first node N1 until the gate potential of the drive transistor T becomes Vdata+Vth. The potential difference between the gate of the drive transistor and its first electrode becomes Vth, the critical turn-on condition of the drive transistor T is reached, and the gate potential of the drive transistor T no longer changes.

In the light emission phase t40 after the write phase t30 is finished, the third scan signal s3 jumps to a low level, the fourth scan signal s4 jumps to a high level, and the data write transistor M2 and the first compensation transistor M31 are both off. The light emission control signal Em jumps to a low-level effective pulse, and the first light emission control transistor M41 and the second light emission control transistor M42 are on. Since the first light emission control transistor M41 is on, the positive power supply signal Pvdd of the positive power supply terminal PVDD is transmitted to the first electrode of the drive transistor T. At this point, the potential difference between the gate of the drive transistor T and its first electrode is Vdata+Vth-Pvdd so that the drive current generated by the drive transistor T is $Id=K^*(Vdata-Pvdd)^2$, where K is a coefficient related to the size and material of the drive transistor T. In this manner, the drive current generated by the drive transistor T is independent of its threshold voltage Vth, and the drive current is transmitted to the anode of the light-emitting element D through the second light emission control transistor M42 that is on so that the light-emitting element D emits light.

Further, with continued reference to FIG. 3, each pixel circuit P may also include a storage capacitor Cst. The storage capacitor Cst is connected between a fixed power supply terminal (for example, the positive power supply terminal PVDD or the negative power supply terminal PVEE) and the first node N1. The storage capacitor C1 is used for storing the potential of the first node N1 (that is, the gate potential of the drive transistor T) to ensure that the drive transistor T can continuously provide the drive current for the light-emitting element 20 in the light emission phase.

Accordingly, with continued reference to FIG. 3, each pixel circuit P may also include an initialization transistor M5. The gate of the initialization transistor M5 is electrically connected to an initialization control terminal SE, the first electrode of the initialization transistor M5 is electrically connected to an initialization signal terminal VINI, and the second electrode of the initialization transistor M5 is electrically connected to the anode of the light-emitting element D. In this manner, when the initialization control signal Se of the initialization control terminal SE controls the initialization transistor M5 to be on, the initialization signal Vini of the initialization signal terminal VINI can be transmitted to the anode of the light-emitting element D to initialize the anode of the light-emitting element D, thereby preventing the drive current provided for the anode of the light-emitting element D in the previous drive cycle from affecting the display brightness of the light-emitting element D in the next drive cycle.

The initialization transistor M5 may be an N-channel transistor or a P-channel transistor. If the initialization transistor M6 is an N-channel transistor, when the initialization control signal Se of the initialization control terminal SE is at a high level, the initialization transistor M5 is on, and when the initialization control signal Se of the initialization control terminal SE is at a low level, the initialization transistor M5 is off. If the initialization transistor M5 is a P-channel transistor, when the initialization control signal Se of the initialization control terminal SE is at a low level, the initialization transistor M5 is on, and when the initialization control signal Se of the initialization control terminal SE is at a high level, the initialization transistor M5 is off. The embodiments of the present disclosure do not specifically limit the type of the initialization transistor M5.

In an optional embodiment, the channel type of the initialization transistor M5 may be the same as the channel type of the data write transistor M2. At this point, since the data write transistor M2 controls the writing of the data signal Vdata before the light-emitting element D emits light, the initialization transistor M5 also initializes the anode of the light-emitting element D before the light-emitting element 20 emits light. In this manner, the fourth scan terminal S4 can be reused as the initialization control terminal SE so that the initialization transistor M5 and the data write transistor M2 can be on or off simultaneously.

In other optional embodiments, the channel type of the initialization transistor M5 may be the same as the channel type of the second reset transistor M12, and at this point, the second scan terminal S2 may be reused as the initialization control terminal SE so that the initialization transistor M5 and the second reset transistor M12 can be on or off simultaneously.

It is to be understood that the type of each transistor in the pixel circuit P and the corresponding drive processes have been illustrated through examples. In the embodiments of the present disclosure, when the type of each transistor in the pixel circuit P changes, the drive processes may be similar to the drive processes described above by changing the signal received by the gate of each transistor. The details are not repeated here.

Figure 8:
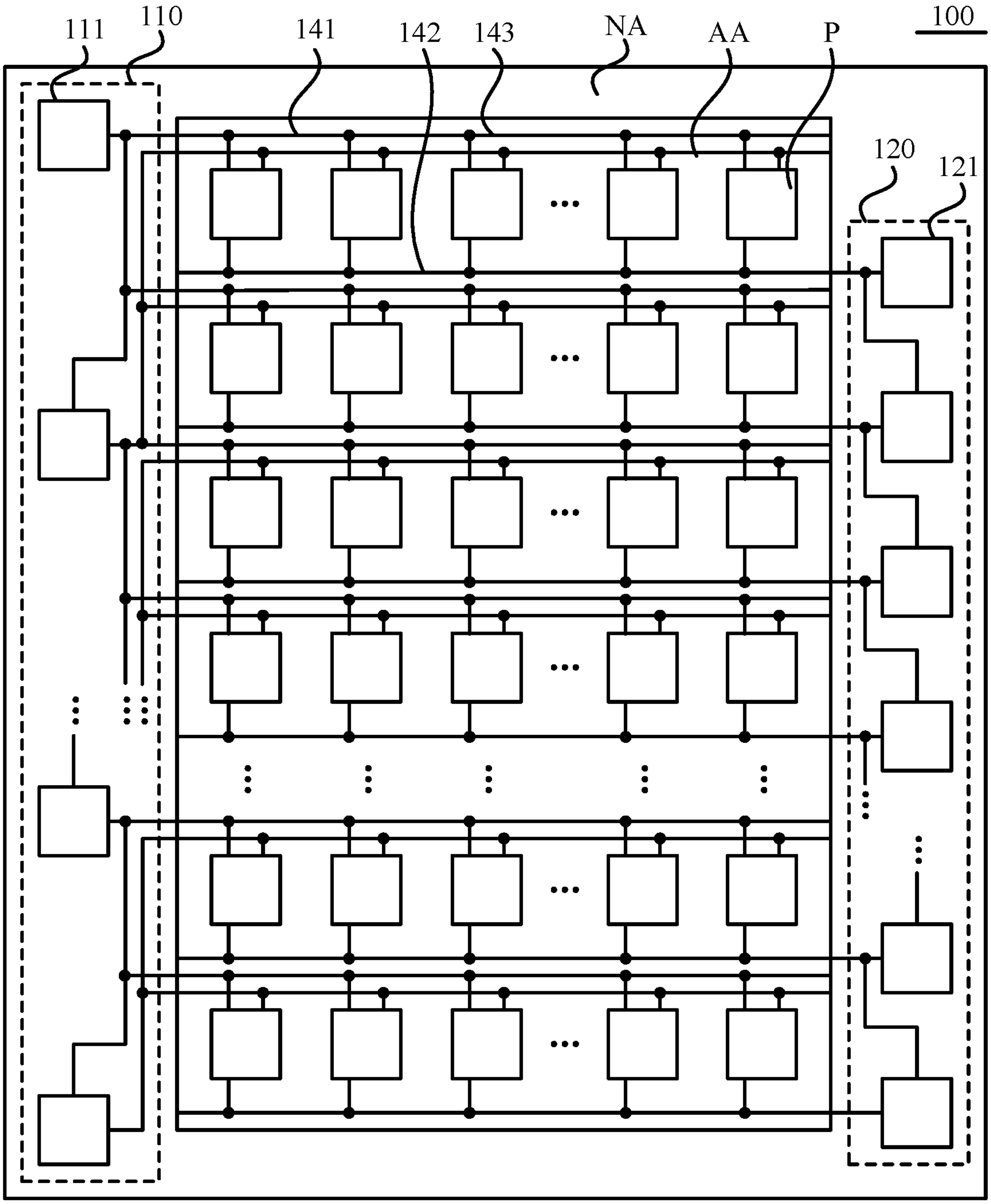
FIG. 8 is yet another structure diagram of a display panel according to an embodiment of the present disclosure.

In an optional embodiment, FIG. 8 is yet another structure diagram of a display panel according to an embodiment of the present disclosure. With reference to FIGS. 3 and 8, when the channel type of the first compensation transistor M31 is the same as the channel type of the first reset transistor M11, the first compensation transistor M31 and the first reset transistor M11 may be both N-channel transistors or P-channel transistors. At this point, the display area AA further includes a plurality of first scan lines 141 and a plurality of third scan lines 143. The first scan terminals S1 of at least part of pixel circuits P in the same row are electrically connected to the same first scan line 141, and the third scan terminals S3 of at least part of pixel circuits P in the same row are electrically connected to the same third scan line 143.

The first scan terminals S1 of at least part of pixel circuits P in the same row are electrically connected to the same first scan line 141, that is, the first scan terminals S1 of part or all of the pixel circuits P in the same row are electrically connected to the same first scan line 141. Accordingly, the third scan terminals S3 of at least part of pixel circuits P in the same row are electrically connected to the same third scan line 143, that is, the third scan terminals S3 of part or all of the pixel circuits P in the same row are electrically connected to the same third scan line 143. For ease of description, unless otherwise specified, the technical solutions in the embodiments of the present disclosure are illustrated through the example in which all of the pixel circuits P in the same row are electrically connected to the same first scan line 141 and the same third scan line 143, respectively.

As shown in FIG. 8, the non-display area NA of the display panel 100 includes a first scan circuit 110. The first scan circuit 110 includes a plurality of cascaded first scan units 111. The first scan line 141 and the third scan line 143 electrically connected to the same pixel circuit P are electrically connected to adjacent two stages of first scan units 111 respectively, the first scan unit 111 at a previous stage in the adjacent two stages of first scan units 111 is electrically connected to the first scan line 141, and the first scan unit 111 at a subsequent stage in the adjacent two stages of first scan units 111 is electrically connected to the third scan line 143. The first stage of first scan unit 111 is electrically connected to N first scan lines 141, and the last stage of first scan unit 111 is electrically connected to N third scan lines 143. Each stage of first scan unit 111 between the first stage of first scan unit 111 and the last stage of first scan unit 111 is electrically connected to adjacent N first scan lines 141 and adjacent N third scan lines 143. N is a positive integer greater than or equal to 2. The effective pulse of the first scan signal s1 outputted by each stage of first scan unit 111 is sequentially shifted, and the shift amount of the effective pulse of the first scan signal s1 is less than the width of the effective pulse of the first scan signal s1.

Specifically, when the first scan line 141 and the third scan line 143 electrically connected to the same pixel circuit P are electrically connected to adjacent two first scan units 111, the first scan circuit 110 providing the first scan signal s1 for the pixel circuit P may be reused as the scan circuit providing the third scan signal s3 for the pixel circuit P, thereby reducing the number of scan circuits set in the non-display area NA, reducing the space occupied by the scan circuits in the non-display area NA and achieving the narrow bezel of the display panel 100. Further, the first stage of first scan unit 111 is electrically connected to N first scan lines 141 so that N rows of pixel circuits P electrically connected to the N first scan lines 141 share the same first scan unit 111. The last stage of first scan unit 111 is electrically connected to N third scan lines 143 so that N rows of pixel circuits P electrically connected to the N third scan lines 143 share the same first scan unit 111. Each stage of first scan unit 111 between the first stage of first scan unit 111 and the last stage of first scan unit 111 is electrically connected to N first scan lines 141 and N third scan lines 143, respectively so that N rows of pixel circuits P electrically connected to the N first scan lines 141 and N rows of pixel circuits P electrically connected to the N third scan lines 143 share the same first scan unit 111. Therefore, the number of first scan units set in the first scan circuit 110 can be reduced, and the size occupied by the first scan circuit 110 can be further reduced.

Further, since for the first scan line 141 and the third scan line 143 electrically connected to the same pixel circuit P, the first scan line 141 is electrically connected to the first scan unit 111 at the previous stage, the third scan line 143 is electrically connected to the first scan unit 111 at the subsequent stage and the first scan signal s1 outputted by each stage of first scan unit 111 is sequentially shifted, the time when the first reset transistor M11 starts to be turned on is before the time when the first compensation transistor M31 starts to be turned on. In this manner, at least part of the duration in which the gate of the drive transistor T is reset is before the duration in which the data signal Vdata is provided for the gate of the drive transistor T so that the data signal Vdata can be written after the gate of the drive transistor T is reset, thereby ensuring the accurate writing of the data signal Vdata to the gate of the drive transistor T.

Figure 9:
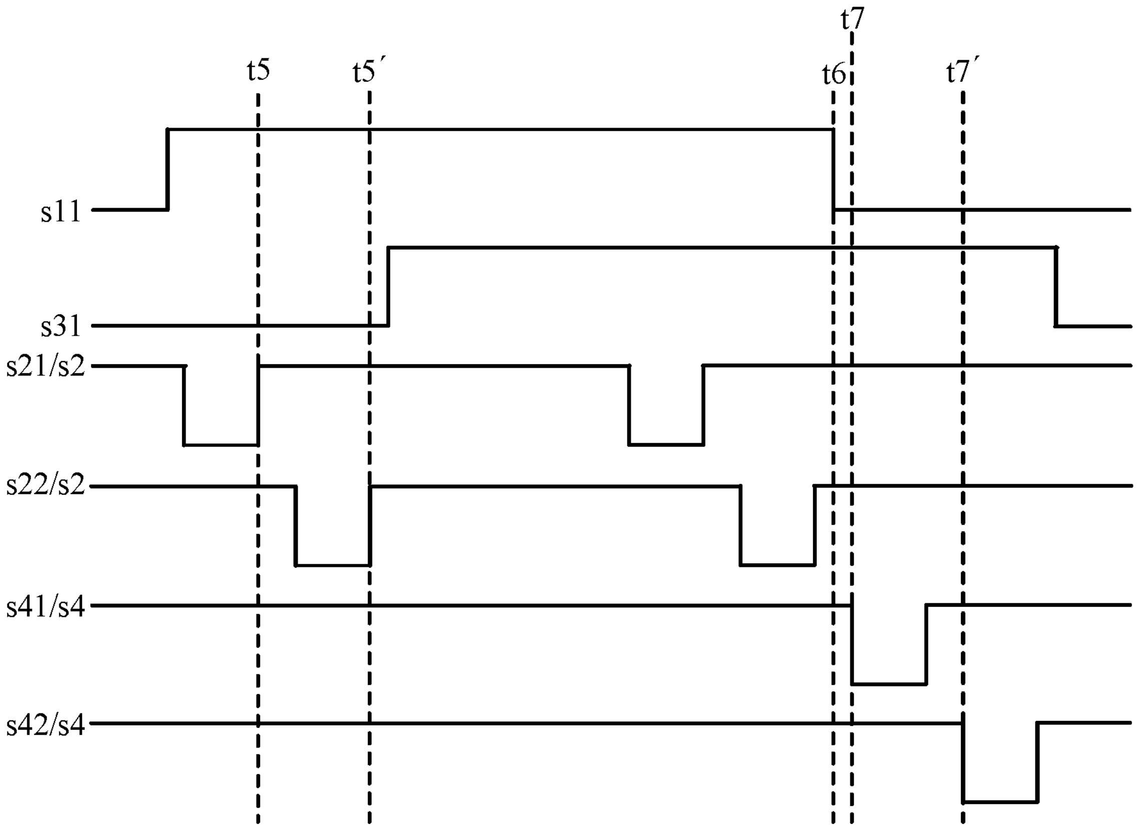
FIG. 9 is another drive timing diagram of each pixel circuit in a display panel according to an embodiment of the present disclosure.

In an optional embodiment, FIG. 9 is another drive timing diagram of each pixel circuit in a display panel according to an embodiment of the present disclosure. With reference to FIGS. 8 and 9, in each pixel circuit P electrically connected to the same first scan unit 11, the end time (t5 and t5') of the first one effective pulse of the second scan signal s2 is before the start time (t7 and t7') of the effective pulse of the fourth scan signal s4.

The gate of the drive transistor T of each pixel circuit P in the first row can be reset only when the first reset transistor M11 and the second reset transistor M12 are simultaneously on, for example, only when the first scan signal s11 and the second scan signal s21 provided for each pixel circuit P in the first row are both effective pulses. The data signal Vdata can be transmitted to the gate of the drive transistor T of each pixel circuit P in the first row only when the data write transistor M2 and the first compensation transistor M13 are simultaneously on, for example, only when the third scan signal s31 and the fourth scan signal s41 provided for each pixel circuit P in the first row are both effective pulse. Therefore, in each pixel circuit P electrically connected to the same first scan unit 111, the end time (t5 and t5') of the first one effective pulse of the second scan signal s2 is set before the start time (t7 and t7') of the effective pulse of the fourth scan signal s4. For example, in the pixel circuit P in the first row and the pixel circuit P in the second row that both are electrically connected to the first stage of first scan unit 111, the end time of the first one effective pulse of the second scan signal s21 received by each pixel circuit P in the first row is t5, and the end time of the first one effective pulse of the second scan signal s22 received by each pixel circuit P in the second row is t5'. The start time of the effective pulse of the fourth scan signal s41 received by each pixel circuit P in the first row is t7, and the start time of the effective pulse of the fourth scan signal s41 received by each pixel circuit P in the second row is t7'. At this point, both t5 and t5' are before t7 and t7'. In this manner, after the gate of the drive transistor T is reset at least once, the drive transistor T can be in the on state in the write phase of the data signal Vdata, ensuring that the data signal Vdata can be written to the gate of the drive transistor T in each pixel circuit P.

In an optional embodiment, with continued reference to FIGS. 3, 8 and 9, in each pixel circuit P electrically connected to the same first scan unit 111, the start time (t7 and t7) of the effective pulse of the fourth scan signal s4 is after the end time t6 of the effective pulse of the first scan signal s1.

Specifically, the first reset transistor M11 is in the on state within the duration in which the first scan signal s1 is an effective pulse. At this point, the state of the second reset transistor M12 is controlled by the second scan signal s2, and then the transmission path of the reset signal Vref of the reset signal terminal VREF to the first node N1 can be controlled. Since the second scan signal s2 includes at least two effective pulses within the duration in which the first scan signal s1 is an effective pulse, the gate of the drive transistor T is reset at least twice after the end time t6 of the effective pulse of the first scan signal s1 so that the gate potential of the drive transistor T is sufficient to support the subsequent writing process of the data signal Vdata. In this manner, when the start time (t7 and t7') of the effective pulse of the fourth scan signal s4 is set after the end time t6 of the effective pulse of the first scan signal s1, the data write transistor M2 is controlled to be on after the gate of the drive transistor T is reset at least twice, and the display cycle enters the write phase. Therefore, the data signal Vdata can be accurately written to the gate of the drive transistor T in the write phase so that the drive transistor T generates an accurate drive current according to the gate of the drive transistor T in the light emission phase to accurately drive the light-emitting element D to emit light.

It is to be understood that illustratively, pixel circuits P in different rows are electrically connected to different second scan lines 142, respectively, and different second scan lines 142 are electrically connected to different second scan units 121 so that the drive transistors of the pixel circuits P in different rows are reset at different times. In the embodiments of the present disclosure, the connection mode between the second scan lines 142 and the second scan units 121 is not limited thereto.

Figure 10:
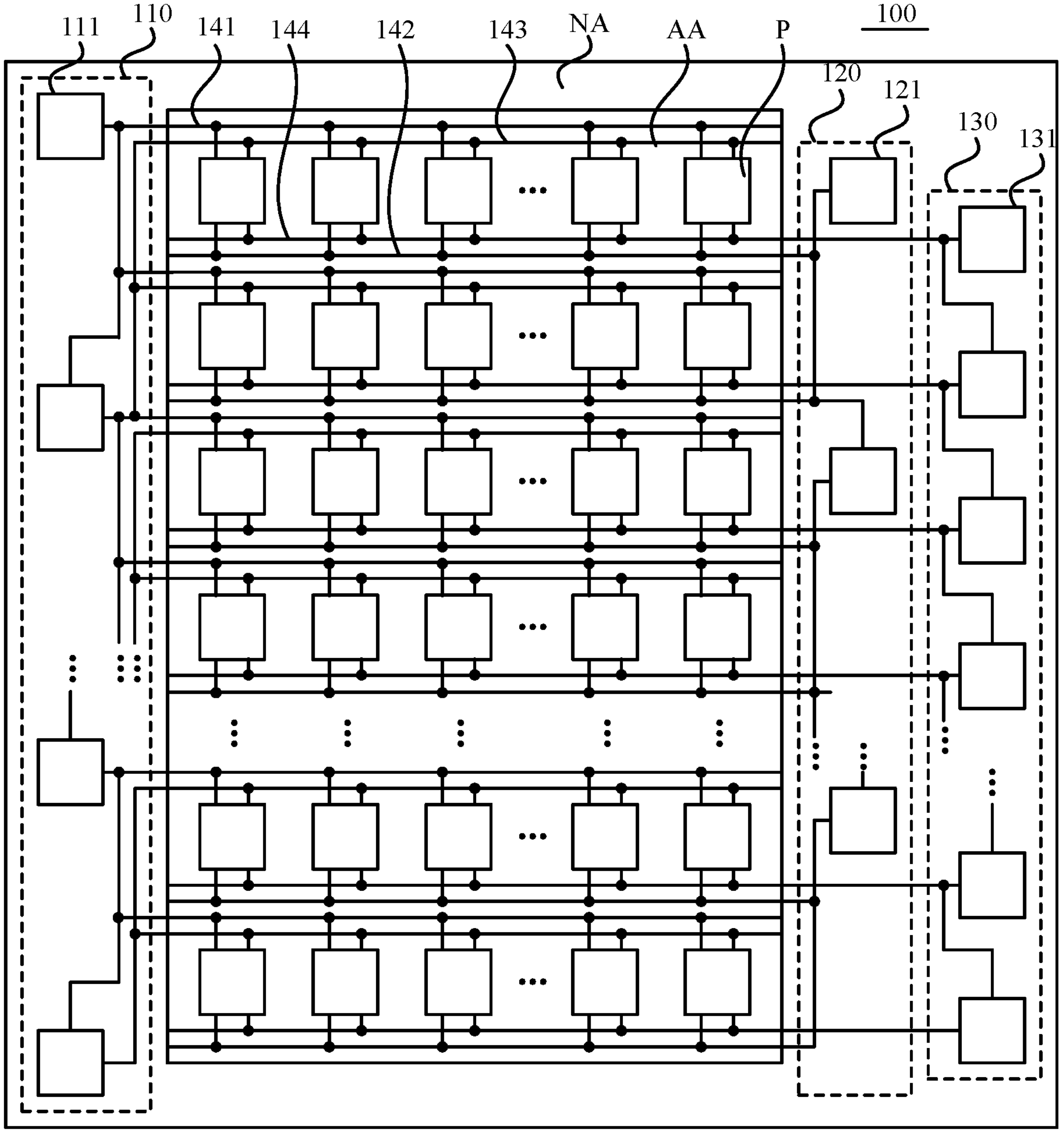
FIG. 10 is yet another structure diagram of a display panel according to an embodiment of the present disclosure.
Figure 11:
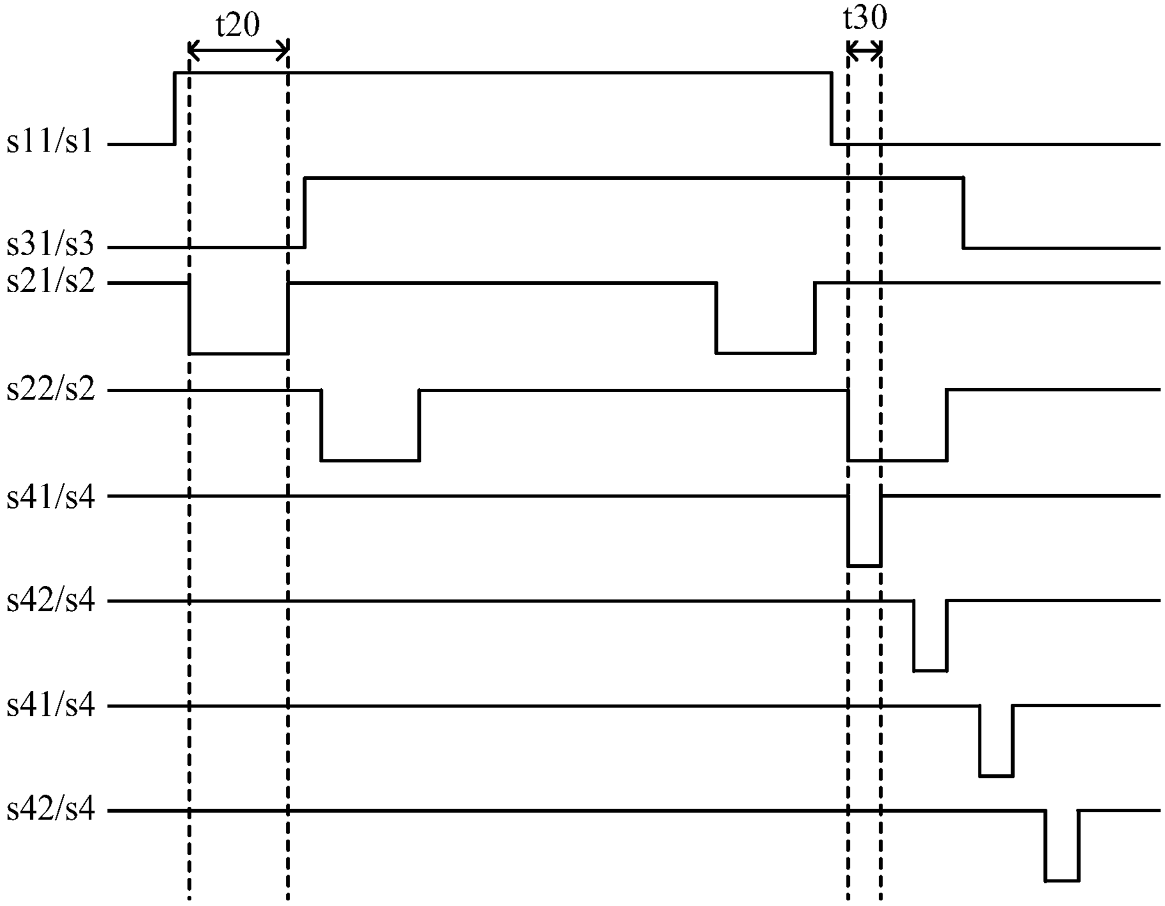
FIG. 11 is yet another drive timing diagram of each pixel circuit in a display panel according to an embodiment of the present disclosure.

Optionally, FIG. 10 is yet another structure diagram of a display panel according to an embodiment of the present disclosure, and FIG. 11 is yet another drive timing diagram of each pixel circuit in a display panel according to an embodiment of the present disclosure. With reference to FIGS. 3, 10 and 11, the display area AA further includes a plurality of second scan lines 142 and a plurality of fourth scan lines 144. Second scan terminals of at least part of pixel circuits P in the same row are electrically connected to the same second scan line 142, and fourth scan terminals of at least part of the pixel circuits P in the same row are electrically connected to the same fourth scan line 144. The non-display area NA further includes a second scan circuit 120 and a third scan circuit 130. The second scan circuit 120 includes a plurality of cascaded second scan units 1221, and the third scan circuit 130 includes a plurality of cascaded third scan units 131.

Each stage of second scan unit 121 is electrically connected to adjacent N second scan lines 142, that is, when the pixel circuits P in the same row share one second scan line 142, each stage of second scan unit 121 provides the second scan signal for the adjacent N rows of pixel circuits P so that the second reset transistors M12 in the N rows of pixel circuits P are simultaneously on or off. The effective pulse of the second scan signal s2 outputted by each second scan unit 121 is sequentially shifted, and the shift amount of the second scan signal s2 is greater than or equal to the width of the effective pulse of the second scan signal. For example, the end time of the effective pulse of the second scan signal s21 outputted by the first stage of second scan unit 121 is after the start time of the effective pulse of the second scan signal s22 outputted by the second stage of second scan unit 121 so that the effective pulses of the second scan signals s22 outputted by these two stages of second scan units 121 are not overlapped each other. In this manner, the second scan terminals s2 of the adjacent N rows of pixel circuits P receive the same second scan signal s2 so that the adjacent N rows of pixel circuits P can be reset simultaneously, thereby shortening the reset duration of each pixel circuit P in the display panel 100, relatively prolonging the light emission duration of the light-emitting element D and improving the display effect of the display panel 100. Further, since the reset signal Vref provided for each row of pixel circuits P is usually the same, even if N rows of pixel circuits P are reset simultaneously, the reset accuracy of each pixel circuit P will not be affected.

Accordingly, each stage of third scan unit 131 is electrically connected to a respective one fourth scan line 144. For example, each stage of third scan unit 131 is electrically connected to one fourth scan line 144. When each pixel circuit P in the same row shares one fourth scan line 144, each stage of third scan unit 131 provides the third scan signal for each pixel circuit P in the same row, and different stages of third scan units 131 provide the third scan signal to pixel circuits P in different rows. For example, the first stage of third scan unit 131 provides the fourth scan signal s41 for the data write transistors M2 of the pixel circuits P in the first row, and the second stage of third scan unit 131 provides the fourth scan signal S42 to the data write transistors M2 of the pixel circuits P in the second row. The effective pulse of the fourth scan signal s4 outputted by each third scan unit 131 is sequentially shifted, and the shift amount of the effective pulse of the fourth scan signal s4 is greater than or equal to the width of the effective pulse of the fourth scan signal s4. For example, the end time of the effective pulse of the fourth scan signal s41 outputted by the first stage of third scan unit 131 is before the start time of the fourth scan signal s42 outputted by the second stage of third scan unit 131 so that the data signal is written to pixel circuits P in different rows at different times to prevent crosstalk between data signals written to the pixel circuits P in different rows due to the fact that the data signal is simultaneously written to the pixel circuits P in different rows, thereby improving the accuracy of the data signals written to the pixel circuits P.

In an optional embodiment, with continued reference to FIGS. 3, 10 and 11, the width t20 of the effective pulse of the second scan signal s2 is greater than or equal to N times the width t30 of the effective pulse of the fourth scan signal s4, and in the same pixel circuit P, the duration of the effective pulse of the second scan signal s2 is not overlapped with the duration of the effective pulse of the fourth scan signal s4.

Specifically, since each stage of second scan unit 121 is electrically connected to N second scan lines 142, the gates of the drive transistors T of N rows of pixel circuits P electrically connected to the N second scan lines 142 can be reset simultaneously. After the drive transistors T of N rows of pixel circuits P are reset, the data signal Vdata needs to be provided for the pixel circuits P in each row, respectively. At this point, the data signal Vdata needs to be controlled to be written to the pixel circuits P in each row at different times. Therefore, when the width t20 of the effective pulse of the second scan signal s2 is set to be greater than or equal to N times the width t30 of the effective pulse of the fourth scan signal s4, the data signal Vdata can be written to N rows of pixel circuits P within the duration of one effective pulse of the second scan signal s2, thereby shortening the writing duration of the data signal Vdata and ensuring that the data signal Vdata can be accurately written to pixel circuits P in each row. Further, when the duration of the effective pulse of the second scan signal s2 is set not to be overlapped with the duration of the effective pulse of the fourth scan signal s4 in the same pixel circuit P, the reset phase and the write phase of the same pixel circuit P can be performed at different times to prevent the writing of the data signal Vdata from affecting the reset of the gate of the drive transistor T and prevent the reset signal Vref from affecting the writing of the data signal Vdata, thereby improving the accuracy of the reset of the gate of the drive transistor T and ensuring that the data signal Vdata can be accurately written to the gate of the drive transistor T.

Figure 12:
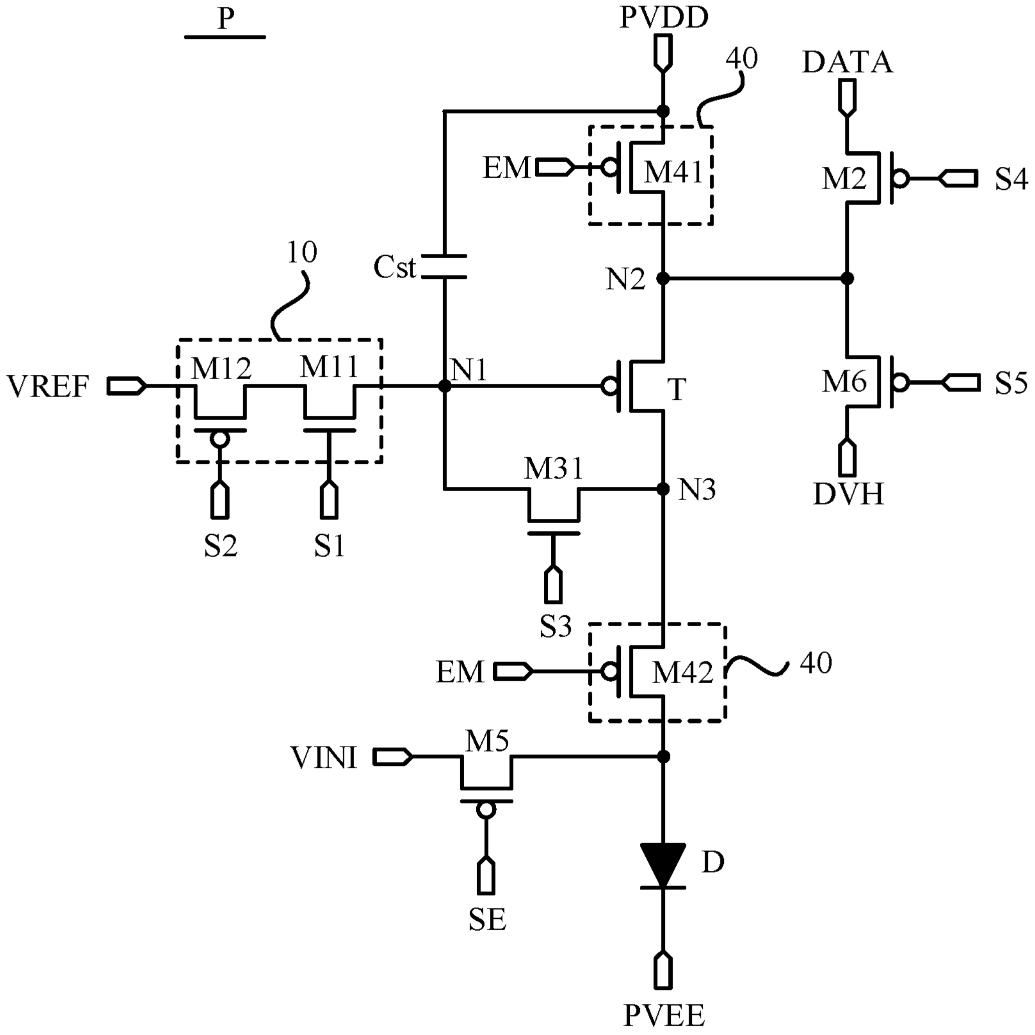
FIG. 12 is yet another structure diagram of a pixel circuit in a display panel according to an embodiment of the present disclosure.

In an optional embodiment, FIG. 12 is yet another structure diagram of a pixel circuit in a display panel according to an embodiment of the present disclosure. As shown in FIG. 12, each pixel circuit P further includes a bias adjustment transistor M6. The gate of the bias adjustment transistor M6 is electrically connected to a fifth scan terminal S5, the first electrode of the bias adjustment transistor M6 is electrically connected to a bias adjustment terminal DVH, and the second electrode of the bias adjustment transistor M6 is electrically connected to the first electrode of the drive transistor T. In the same pixel circuit P, durations of at least part of effective pulses of the fifth scan signal s5 of the fifth scan terminal S5 are not overlapped with the duration of the effective pulse of the third scan signal s3, and durations of the effective pulses of the fifth scan signal s5 are not overlapped with the duration of the effective pulse of the fourth scan signal s4.

It is to be understood that the bias adjustment transistor M6 may be an N-channel transistor or a P-channel transistor. If the bias adjustment transistor M6 is an N-channel transistor, when the fifth scan signal s5 of the fifth scan terminal S5 is at a high level, the bias adjustment transistor M6 is on, and when the fifth scan signal s5 is at a low level, the bias adjustment transistor M6 is off. At this point, the duration in which the fifth scan signal s5 is at a high level is the duration of the effective pulse of the fifth scan signal s5. If the bias adjustment transistor M6 is a P-channel transistor, when the fifth scan signal s5 is at a low level, the bias adjustment transistor M6 is on, and when the fifth scan signal s5 is at a high level, the bias adjustment transistor M6 is off. At this point, the duration in which the fifth scan signal s5 is at a low level is the duration of the effective pulse of the fifth scan signal s5.

When the drive transistor T is in the on state, a certain potential difference exists between the gate and the first electrode of the drive transistor T. In this manner, the drive transistor T is in a bias state, the I-V curve of the drive transistor is shifted, the threshold voltage of the drive transistor T is drifted, and the drive current cannot be accurately provided for the light-emitting element D, affecting the display effect. When the bias adjustment transistor M6 is set in the pixel circuit P, when the bias adjustment transistor M6 is on, the bias adjustment signal Vpark of the bias adjustment terminal DVH can be written to the first electrode of the drive transistor T through the bias adjustment transistor M6 that is on. In this manner, the first electrode potential of the drive transistor T is consistent with the bias adjustment signal Vpark, the potential difference between the gate and the first electrode of the drive transistor T is improved, the bias adjustment of the drive transistor T is achieved, and the shift of the I-V curve of the drive transistor T is balanced, and the threshold voltage drift of the drive transistor T is improved, thereby ensuring the display uniformity of the display panel.

Figure 13:
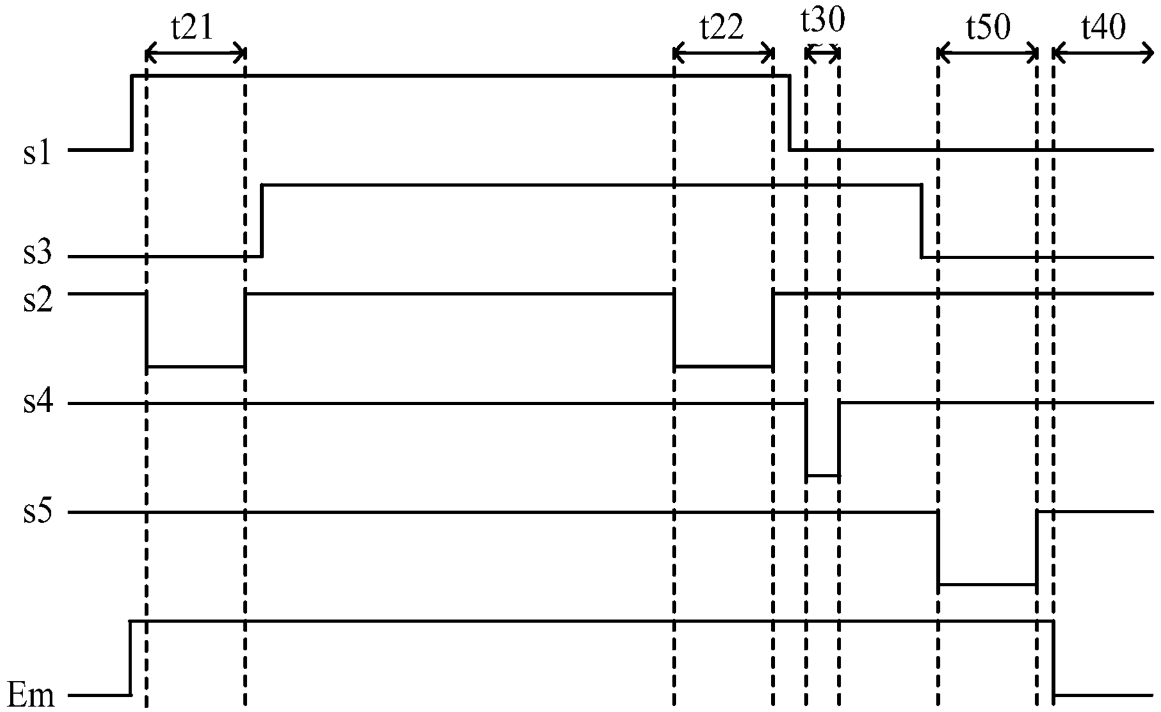
FIG. 13 is yet another drive timing diagram of a pixel circuit according to an embodiment of the present disclosure.

For example, the following is described using an example in which the bias adjustment transistor M6 is a P-channel transistor. FIG. 13 is yet another drive timing diagram of a pixel circuit according to an embodiment of the present disclosure. For the similarities between FIG. 13 and FIG. 7, reference may be made to the description of FIG. 7, and the details are not repeated here. Only the differences between FIG. 13 and FIG. 7 will be illustrated below. With reference to FIGS. 12 and 13, each drive cycle of the pixel circuit P further includes a bias adjustment phase t50, and the bias adjustment phase t50 is after the write phase t30 and before the light emission phase t40. In the light emission phase of the previous drive cycle, the drive transistor T provides a drive current for the light-emitting element D so that the drive transistor T is in an on state, and in the on state, the drive transistor T is in a bias state for a long time so that I-V of the drive transistor T is shifted. In the write phase t30, the drive transistor T is in the on state due to the writing of the data signal Vdata so that the drive transistor T is in the bias state, affecting the characteristics of the drive transistor. In the bias adjustment phase t50, the fifth scan signal s5 is an effective pulse, the bias adjustment transistor M6 is on, and the bias adjustment signal Vpark is written to the first electrode of the drive transistor T so that the potential difference between the gate and the first electrode of the drive transistor T is adjusted to perform bias adjustment on the drive transistor T, thereby improving the phenomenon that the drive current provided for the light-emitting element D in the subsequent light emission phase t40 is affected due to the I-V curve shift of the drive transistor T, improving the display light emission accuracy of the light-emitting element D and further improving the display effect of the display panel. Further, since the data write transistor M2 provides the data signal Vdata for the first electrode of the drive transistor T in the write phase t30, the first electrode potential of the drive transistor T is equivalent to the voltage of the data signal Vdata; the first electrode potentials of the drive transistors T of different pixel circuits P are different due to the difference between the data signals Vdata written to different pixel circuits P so that different pixel circuits P have different bias states, affecting the display uniformity of the display panel in the subsequent light emission phase t40. Since the bias adjustment phase t50 is set after the write phase t30, the same bias adjustment signal Vpark is provided for the first electrodes of the drive transistors T of different pixel circuits P so that the first electrode potential of the drive transistor T of each pixel circuit P is consistent before the light emission phase t40, thereby improving the display uniformity of the display panel in the subsequent light emission phase t40.

Figure 14:
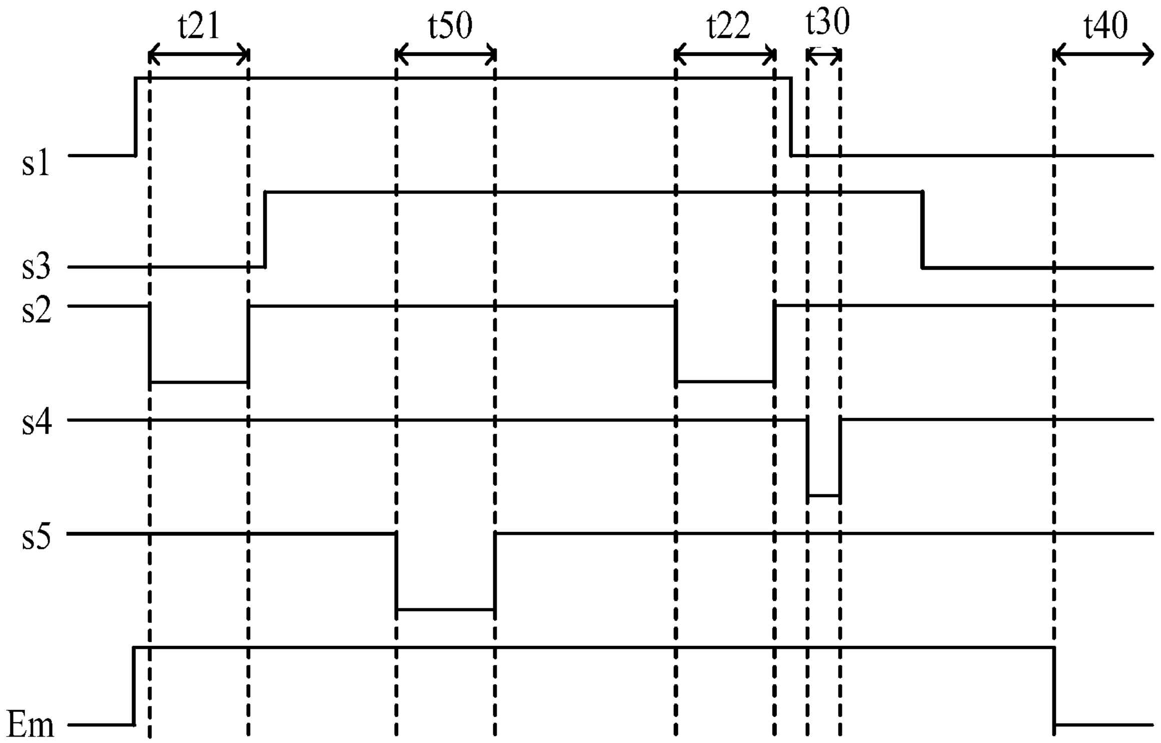
FIG. 14 is yet another drive timing diagram of a pixel circuit according to an embodiment of the present disclosure.

In another optional embodiment, with reference to FIGS. 12 and 14, the bias adjustment phase t50 may also be before the write phase t30. For example, the bias adjustment phase t50 is between the reset phase t21 and the reset phase t22. In this manner, after the gate of the drive transistor T is reset once, the drive transistor T is in the on state, and the bias adjustment signal Vpark is continuously provided for the first electrode of the drive transistor T. The bias adjustment signal Vpark is transmitted through the first electrode of the drive transistor to the second electrode of the drive transistor so that the first electrode potential of the drive transistor T is kept consistent with the second electrode potential of the drive transistor T, thereby improving the phenomenon that the threshold voltage is drifted due to the large potential difference among the gate, the first electrode and the second electrode of the drive transistor T and facilitating the accurate writing of the data signal Vdata in the write phase t30.

Figure 15:
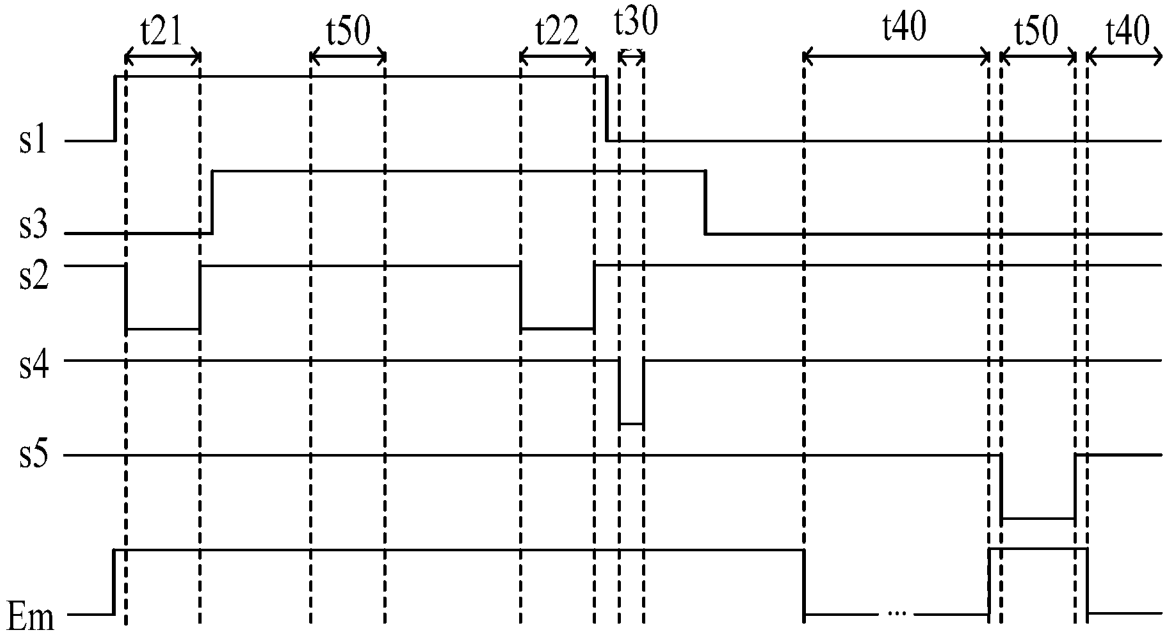
FIG. 15 is yet another drive timing diagram of a pixel circuit according to an embodiment of the present disclosure.

In yet another embodiment, with reference to FIGS. 13 and 15, one drive cycle of the pixel circuit P may include a plurality of light emission phases t40, and the bias adjustment phase t50 may also be between adjacent two light emission phases t40. In this manner, after one light emission phase t40 is finished, the bias adjustment phase t50 starts, and the bias adjustment signal Vpark can be written to the first electrode of the drive transistor T, thereby improving the potential difference between the gate and the first electrode of the drive transistor T and balancing the I-V curve shift of the drive transistor T. Therefore, the drive transistor T can provide an accurate drive current for the light-emitting element D in the subsequent light emission phase t40 so that the light-emitting element D emits light accurately, thereby improving the display effect of the display panel.

It is to be understood that the duration in which the bias adjustment transistor M6 is on is illustrated above, and the embodiments of the present disclosure do not specifically limit the duration in which the bias adjustment transistor M6 is on as long as the bias adjustment of the drive transistor T can be achieved.

It is to be noted that in FIGS. 13 to 15, illustratively, in one drive cycle, the fifth scan signal s5 for controlling the bias adjustment transistor M6 to be on or off includes only one effective pulse. In the embodiments of the present disclosure, the number of effective pulses of the fifth scan signal s5 in each drive cycle may be set according to requirements and is not specifically limited in the embodiments of the present disclosure.

Figure 16:
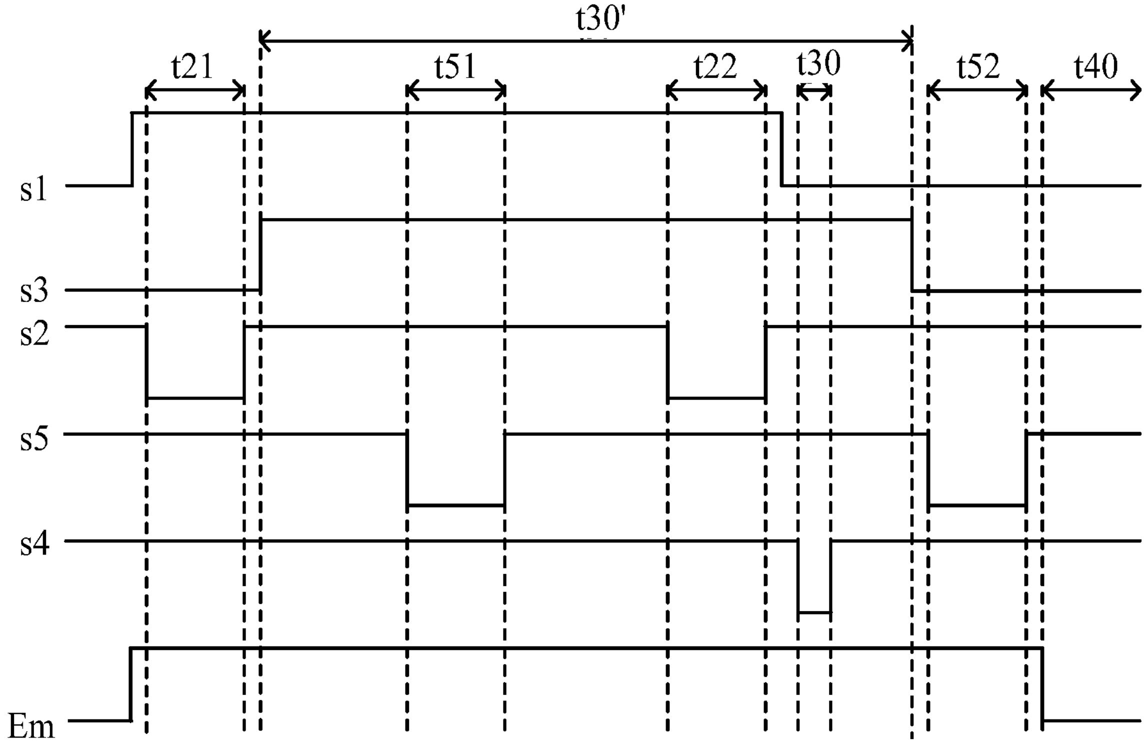
FIG. 16 is yet another drive timing diagram of a pixel circuit according to an embodiment of the present disclosure.

Optionally, FIG. 16 is yet another drive timing diagram of a pixel circuit according to an embodiment of the present disclosure. With reference to FIGS. 12 and 16, part of the effective pulses of the fifth scan signal s5 is a first effective pulse. In the same pixel circuit P, the duration t51 of the first effective pulse of the fifth scan signal s5 is overlapped with the duration t30' of the effective pulse of the third scan signal s3, and the duration t51 of the first effective pulse of the fifth scan signal s5 is between durations (t21 and t22) of adjacent two effective pulses of the second scan signal s2.

Specifically, within the durations (t21 and t22) in which the second scan signal s2 is an effective pulse, the reset signal Vref can be written to the first node N1 to reset the drive transistor T so that the data signal written to the gate of the drive transistor T in the previous drive cycle can be cleared and the drive transistor T can be in the on state. When the duration t51 of the first effective pulse of the fifth scan signal s5 is set between the duration (t21 and t22) of the effective pulse of adjacent two second scan signals s2, after the gate of the drive transistor T is reset at least once, the bias adjustment is performed on the drive transistor T so that the bias adjustment signal Vpark can be transmitted to the first electrode of the drive transistor T through the bias adjustment transistor M6 and then to the second electrode of the drive transistor T through the drive transistor T, thereby keeping the first electrode potential of the drive transistor T consistent with the second electrode potential of the drive transistor T. Further, in the same pixel circuit P, the duration t51 of the first effective pulse of the fifth scan signal s5 is set to be overlapped with the duration t30' of the effective pulse of the third scan signal s3, and the bias transistor M6 and the first compensation transistor M31 are simultaneously on within the overlapping duration so that the bias adjustment signal Vpark is transmitted to the gate of the drive transistor T through the bias adjustment transistor M6, the drive transistor T and the first compensation transistor M31 sequentially, thereby keeping the potentials of the first electrode, the second electrode and the gate of the drive transistor T all consistent with each other, balancing the I-V curve shift of the drive transistor T, improving the threshold drift of the drive transistor T and further improving the display uniformity of the display panel.

In an optional embodiment, with continued reference to FIGS. 12 and 16, the fifth scan signal s5 may also include at least one second effective pulse, and the duration t52 of the second effective pulse may be after the duration t30 of the effective pulse of the fourth scan signal s4. At this point, the first electrode potential of the drive transistor T in each pixel circuit P can be kept consistent before each pixel circuit P enters the light emission phase 40, thereby further improving the display uniformity of the display panel.

It is to be understood that with continued reference to FIGS. 12 and 16, the number of effective pulses of the fifth scan signal s5 may be the same as the number of effective pulses of the second scan signal s2. At this point, when the width of the effective pulse of the fifth scan signal s5 is also the same as the width of the effective pulse of the second scan signal s2, the fifth scan signal s5 and the second scan signal s2 may be provided for the pixel circuit P, respectively, using the same scan circuit.

Figure 17:
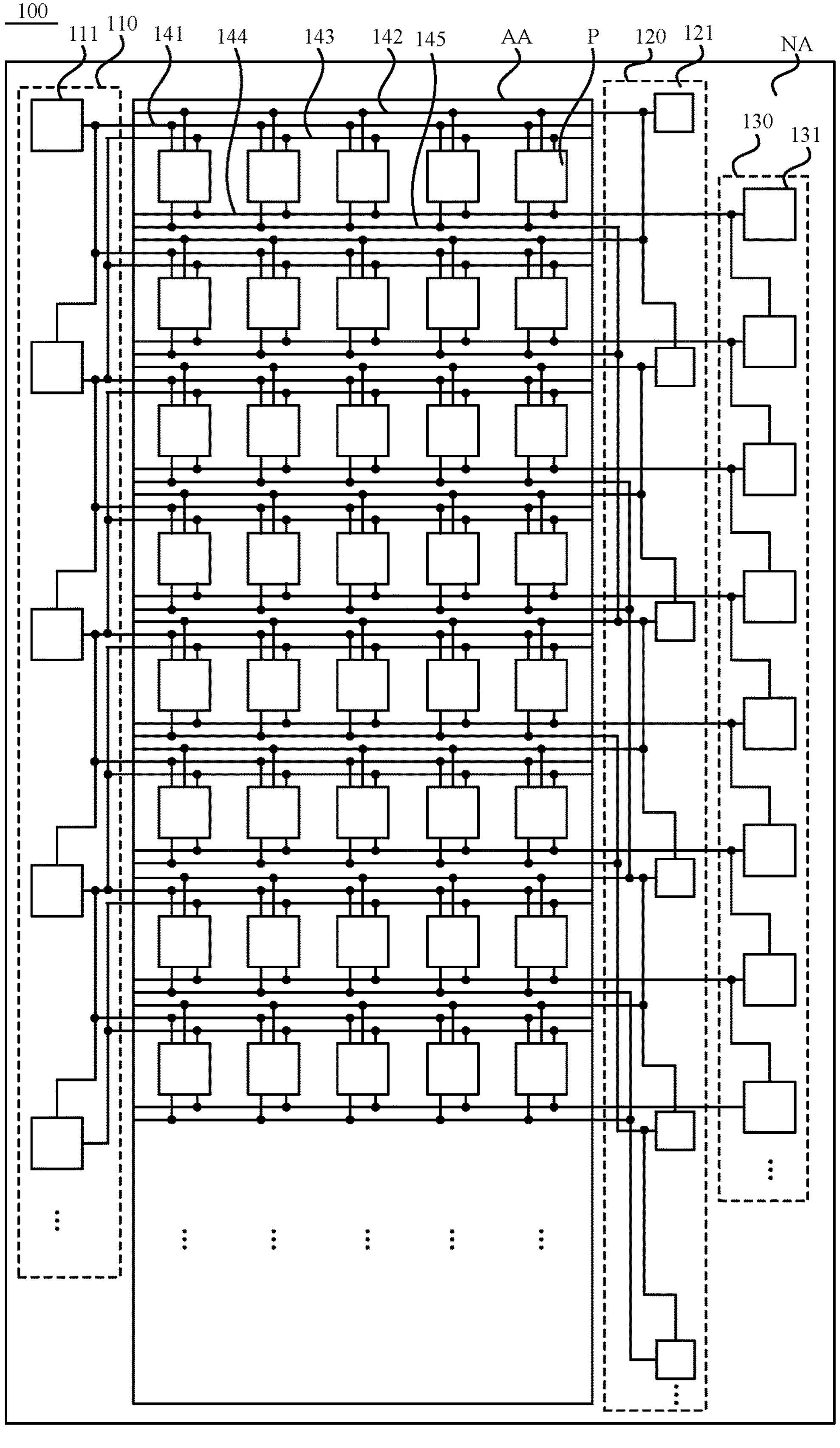
FIG. 17 is yet another structure diagram of a display panel according to an embodiment of the present disclosure.

Optionally, FIG. 17 is yet another structure diagram of a display panel according to an embodiment of the present disclosure. With reference to FIGS. 12 and 17, the display area AA further includes second scan lines 142 and fifth scan lines 145. Second scan terminals S2 of at least part of pixel circuits P in the same row are electrically connected to the same second scan line 142, and fifth scan terminals S5 of at least part of the pixel circuits P in the same row are electrically connected to the same fifth scan line 145. In this manner, the second scan terminals S2 of at least part of the pixel circuits P in the same row can receive the same second scan signal s2, and the fifth scan terminals S5 of at least part of the pixel circuits P in the same row can receive the same fifth scan signal s5, thereby achieving the progressive scanning of each pixel circuit P in the display panel 100. For ease of description, the embodiments of the present disclosure are illustrated through the example in which second scan terminals S2 of pixel circuits P in the same row are electrically connected to the same second scan line 142 and fifth scan terminals S5 of pixel circuits P in the same row are electrically connected to the same fifth scan line 145.

With continued reference to FIGS. 12 and 17, the display panel 100 further includes a non-display area NA. The non-display area NA further includes a second scan circuit 120. The second scan circuit 120 includes a plurality of cascaded second scan units 121. The second scan line 142 and the fifth scan line 145 electrically connected to the same pixel circuit P are electrically connected to adjacent two odd-numbered stages of second scan units 121 respectively or are electrically connected to adjacent two even-numbered stages of second scan units 121 respectively, the second scan unit 121 at a previous stage in the adjacent two odd-numbered stages of second scan units 121 or in the adjacent two even-numbered stages of second scan units 121 is electrically connected to the second scan line 142, and the second scan unit 121 at a subsequent stage in the adjacent two odd-numbered stages of second scan units 121 or in the adjacent two even-numbered stages of second scan units 121 is electrically connected to the fifth scan line 145. The effective pulse of the second scan signal s2 outputted by each stage of second scan unit 121 is sequentially shifted, and the shift amount of the effective pulse of the second scan signal s2 is greater than or equal to the width of the effective pulse of the second scan signal s2. In this manner, in each pixel circuit P, the reset phase in which the gate of the drive transistor T is reset is before the bias adjustment phase in which the bias adjustment signal Vpark is written to the first electrode of the drive transistor T, and the reset phase and the bias adjustment phase are performed at different times without affecting each other, thereby ensuring the accuracy of reset and bias adjustment of each drive transistor T.

Optionally, with continued reference to FIG. 17, when the second scan circuit 120 includes M stages of second scan units 121, a first stage of second scan unit 121 and a second stage second scan unit 121 are electrically connected to adjacent N second scan lines 142 respectively, and an $(M-1)^{h}$ stage of second scan unit 121 and an $M^{th}$ stage of second scan unit 121 are electrically connected to adjacent N fifth scan lines 145 respectively. Each stage of second scan unit 121 between the second stage of second scan unit 121 and the $(M-1)^{th}$ stage of second scan unit 121 is electrically connected to adjacent N second scan lines 142 and adjacent N fifth scan lines 145. M is an even number greater than or equal to 4, and N is a positive integer greater than or equal to 2.

Figure 18:
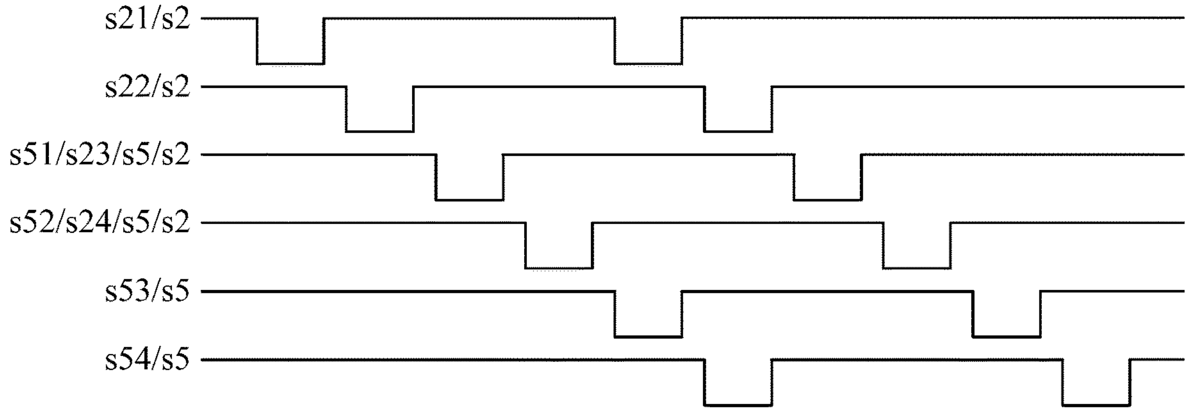
FIG. 18 is yet another drive timing diagram of each pixel circuit in a display panel according to an embodiment of the present disclosure.

For example, FIG. 18 is yet another drive timing diagram of each pixel circuit in a display panel according to an embodiment of the present disclosure. With reference to FIGS. 12, 17 and 18, the following is described using an example in which N is equal to 2 and M is equal to 6. The first stage of second scan unit 121 is electrically connected to two second scan lines 142 corresponding to the first row of pixel circuits P and the second row of pixel circuits P respectively so that the first stage of second scan unit 121 can simultaneously provide the second scan signal s21 for the second scan terminals S2 of the first row of pixel circuits P and the second row of pixel circuits P. The second stage of second scan unit 121 is electrically connected to two second scan lines 142 corresponding to the third row of pixel circuits P and the fourth row of pixel circuits P respectively so that the second stage of second scan unit 121 can simultaneously provide the second scan signal s22 for the second scan terminals S2 of the third row of pixel circuits P and the fourth row of pixel circuits P. The third stage of second scan unit 121 is electrically connected to two fifth scan lines 145 corresponding to the first row of pixel circuits P and the second row of pixel circuits P respectively and is also electrically connected to two second scan lines 142 corresponding to the fifth row of pixel circuit P and the sixth row of pixel circuit P respectively so that the third stage of second scan unit 121 can simultaneously provide the fifth scan signal s51 for the fifth scan terminals S5 of the first row of pixel circuits P and the second row of pixel circuit P and simultaneously provides the second scan signal s23 for the second scan terminals S2 of the fifth row of pixel circuit P and the sixth row of pixel circuits P. The fourth stage of second scan unit 121 is electrically connected to two fifth scan lines 145 corresponding to the third row of pixel circuits P and the fourth row of pixel circuits P respectively and is also electrically connected to two second scan lines 142 corresponding to the seventh row of pixel circuits P and the eighth row of pixel circuits P respectively so that the fourth stage of second scan unit 121 can simultaneously provide the fifth scan signal s52 for the fifth scan terminals S5 of the third row of pixel circuits P and the fourth row of pixel circuits P and simultaneously provides the second scan signal s24 for the second scan terminals S2 of the seventh row of pixel circuits P and the eighth row of pixel circuits P. The fifth stage of second scan unit 121 is electrically connected to two fifth scan lines 145 corresponding to the fifth row of pixel circuits P and the sixth row of pixel circuits P respectively so that the fifth stage of second scan unit 121 can simultaneously provide the fifth scan signal s53 to the second scan terminals S2 of the fifth row of pixel circuits P and the sixth row of pixel circuits P. The sixth stage of second scan unit 121 is electrically connected to two fifth scan lines 145 corresponding to the seventh row of pixel circuits P and the eighth row of pixel circuits P respectively so that the sixth stage of second scan unit 121 can simultaneously provide the fifth scan signal s54 for the second scan terminals S2 of the seventh row of pixel circuits P and the eighth row of pixel circuits P.

In this manner, when the second scan terminals S2 of the adjacent N rows of pixel circuits P are set to electrically connected to the same second scan unit 121 and the fifth scan terminals S5 of the adjacent N rows of pixel circuits P are set to electrically connected to the same second scan unit 121, the number of the second scan units 121 set in the non-display area NA of the display panel 100 can be reduced, thereby simplifying the circuit structure of the non-display area NA of the display panel 100, reducing the size of the non-display area NA and achieving the narrow bezel of the display panel 100.

It is to be understood that illustratively, each second scan unit 121 is electrically connected to two second scan lines 142 and/or two fifth scan lines 145, respectively, that is, N is equal to 2. In the embodiments of the present disclosure, the value of N may be set according to requirements, and the embodiments of the present disclosure do not specifically limit the value of N.

Figure 19:
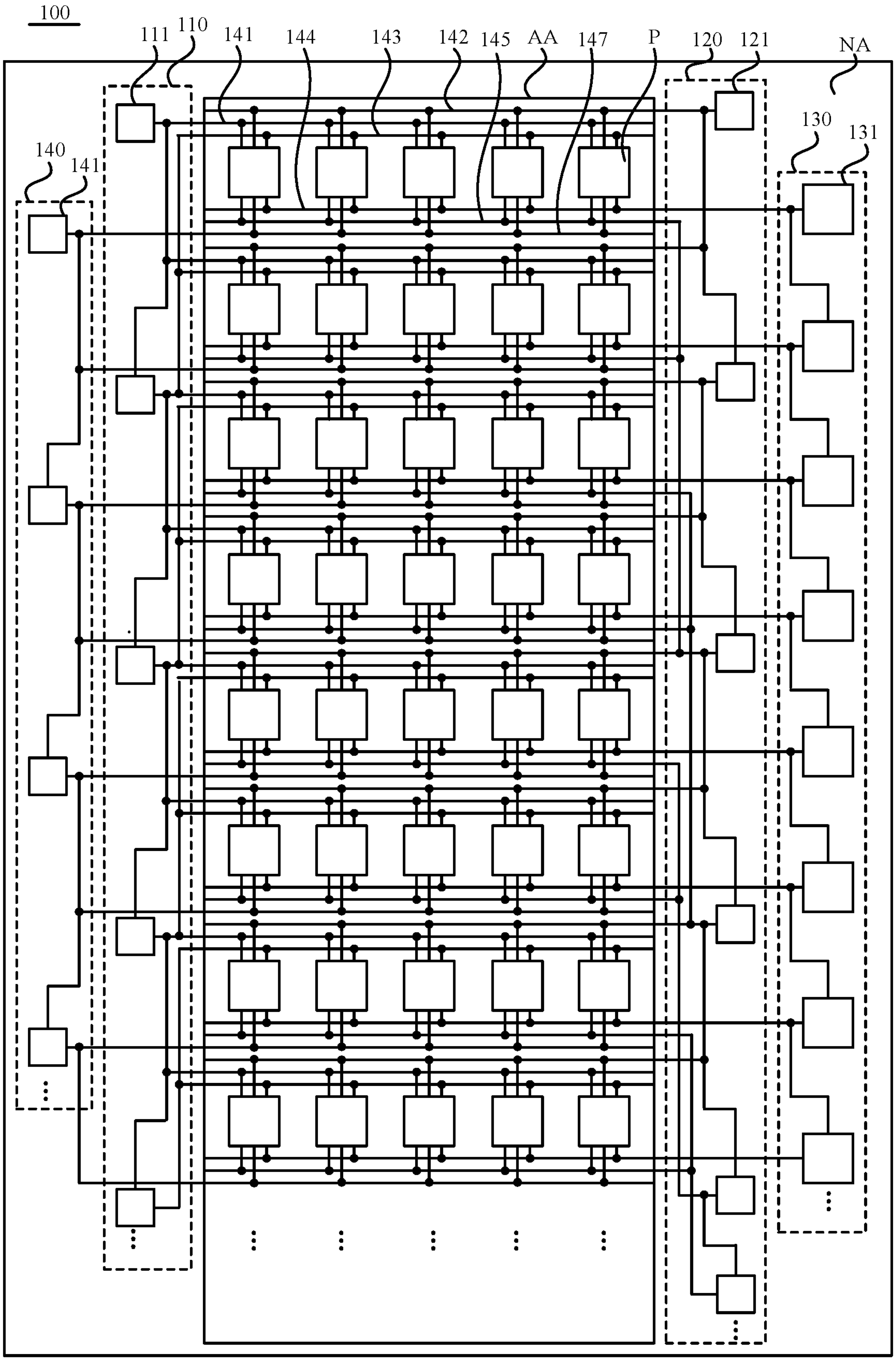
FIG. 19 is yet another structure diagram of a display panel according to an embodiment of the present disclosure.
Figure 20:
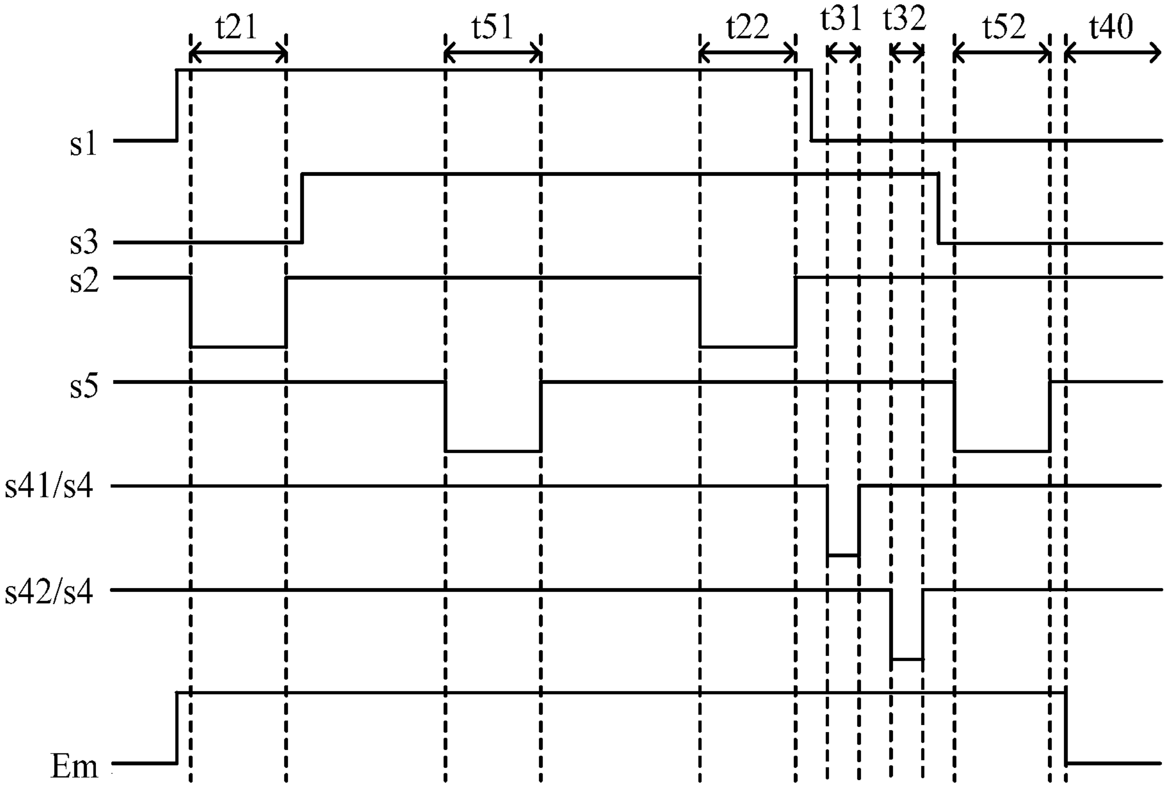
FIG. 20 is yet another structure diagram of a pixel circuit in a display panel according to an embodiment of the present disclosure.

In an optional embodiment, FIG. 19 is yet another structure diagram of a display panel according to an embodiment of the present disclosure, and FIG. 20 is yet another structure diagram of a pixel circuit in a display panel according to an embodiment of the present disclosure. With reference to FIGS. 12, 19 and 20, the following is described using an example in which N is equal to 2. When the display panel 100 includes a first scan circuit 110, a second scan circuit 120, a third scan circuit 130 and a light emission control circuit 140, each stage of first scan unit 111 in the first scan circuit 110 is electrically connected to two first scan lines 141 and/or two third scan lines 143, each stage of second scan unit 121 in the second scan circuit 120 is electrically connected to two second scan lines 142 and/or two fifth scan lines 145, each stage of third scan unit 131 in the third scan circuit 130 is electrically connected to a respective one fourth scan line 144, and each stage of light emission control unit 141 in the light emission control circuit 140 is electrically connected to two light emission control lines 147. At this point, the drive process of adjacent two rows of pixel circuits P may be as follows: in the first reset phase t21, the first reset transistors M11 and the second reset transistors M12 of the two rows of pixel circuits P are simultaneously on to simultaneously reset the gates of the drive transistors T of the two rows of pixel circuits P; in the first bias adjustment phase t51, the bias adjustment transistors M6 and the first compensation transistors M31 of the two rows of pixel circuits P are simultaneously on to simultaneously perform bias adjustment on the drive transistors T of the two rows of pixel circuits P; in the second reset phase t22, the first reset transistors M11 and the second reset transistors M12 of the two rows of pixel circuits P are on again to further reset the gates of the drive transistors T of the two rows of pixel circuits P; in the write phase t31 of a previous row of pixel circuits P in the two rows of pixel circuits P, the data write transistors M2 and the first compensation transistors M31 of the row of pixel circuits P are on to enable the data signal Vdata of each pixel circuit P in the row of pixel circuits P to be written to the gate of the drive transistor T of a respective one of the row of pixel circuits P; in the write phase t32 of a subsequent row of pixel circuits P in the two rows of pixel circuits P, the data write transistors M2 and the first compensation transistors M31 of the row of pixel circuits P are on to enable the data signal Vdata of each pixel circuit P in the row of pixel circuits P to be written to the gate of the drive transistor T of a respective one of the row of pixel circuits P; in the second bias adjustment phase t52, the bias adjustment transistors M6 and the first compensation transistors M31 of the two rows of pixel circuits P are on again to simultaneously perform bias adjustment on the drive transistors T of the two rows of pixel circuits P; and in the light emission phase t40, the first light emission control transistors M41 and the second light emission control transistors M42 of the two rows of pixel circuits P are simultaneously on to enable the light-emitting elements D of the two rows of pixel circuits P to simultaneously emit light. In this manner, the data signal Vdata of each pixel circuit P can be written to the gate of the drive transistor T of a respective one of the pixel circuits P, and the number of scan circuits set in the non-display area NA of the display panel 100 and the number of scan units in each scan circuit can be reduced, thereby achieving the narrow bezel of the display panel.

It is to be understood that illustratively, each drive cycle of the pixel circuit P includes two bias adjustment phases for bias adjustment of the drive transistor T. In the embodiments of the present disclosure, the bias adjustment of the drive transistor T may also be achieved in other manners.

Figure 21:
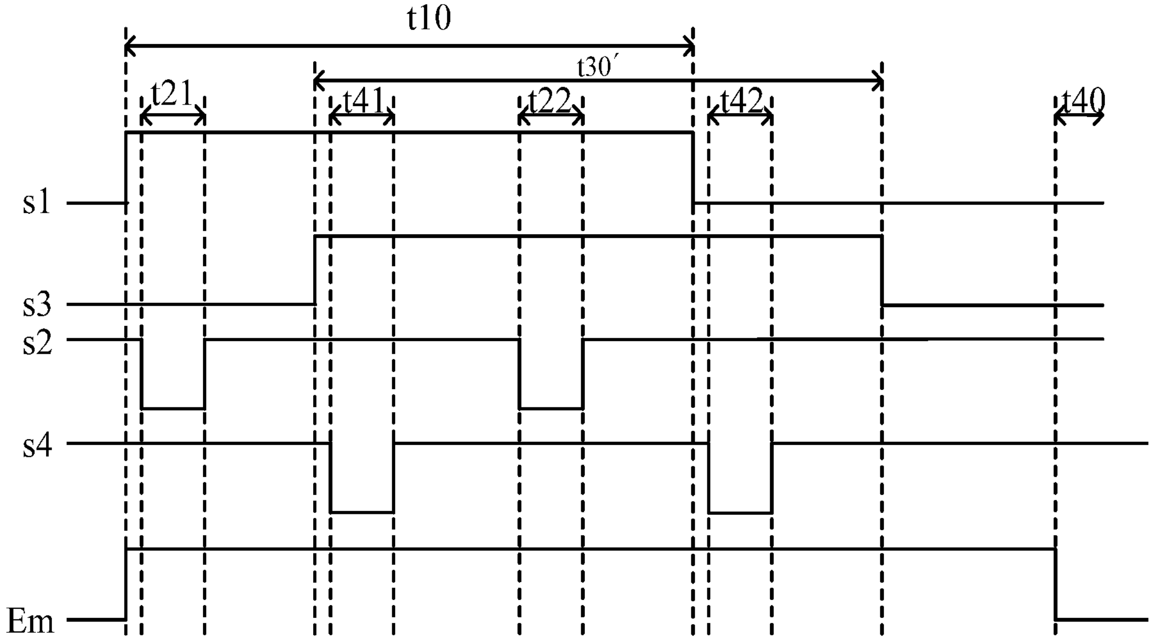
FIG. 21 is yet another drive timing diagram of a pixel circuit according to an embodiment of the present disclosure.

Optionally, FIG. 21 is yet another drive timing diagram of a pixel circuit according to an embodiment of the present disclosure. With reference to FIGS. 3 and 21, in the same pixel circuit P, the duration t30' of the effective pulse of the third scan signal s3 of the third scan terminal S3 is overlapped with durations (t41 and t42) of at least two effective pulses of the fourth scan signal s4 of the fourth scan terminal S4.

The effective pulse of the third scan signal s3 can control the first compensation transistor M31 to be on so that the first compensation transistor M31 is kept in the on state within the duration t30' of the effective pulse of the third scan signal s3, and the effective pulse of the fourth scan signal s4 can control the data write transistor M2 to be on. In this manner, within the overlapping duration (t41 and t42) of the effective pulses of the third scan signal s3 and the fourth scan signal s4, the data write transistor M2 and the first compensation transistor M31 are simultaneously in the on state so that the data signal Vdata of the DATA signal terminal DATA can be transmitted to the gate of the drive transistor T, and in the transmission process of the data signal Vdata, the data signal Vdata passes through the first electrode and the second electrode of the drive transistor T sequentially and then reaches the gate of the drive transistor T so that the potentials of the first electrode, the second electrode and the gate of the drive transistor T can be kept consistent. Further, since the duration t30' of the effective pulse of the third scan signal s3 is overlapped with the durations (t41 and t42) of at least two effective pulses of the fourth scan signal s4, for example, the duration t30' of the effective pulse of the third scan signal s3 is overlapped with the durations (t41 and t42) of the two effective pulses of the fourth scan signal s4, within the first one overlapping duration between the third scan signal s3 and the fourth scan signal s4, the data signal Vdata is transmitted to the gate of the drive transistor T through the data write transistor M2, the drive transistor T and the first compensation transistor M31 sequentially so that the potentials of the first electrode, the second electrode and the gate of the drive transistor T are kept consistent, thereby achieving the bias adjustment of the drive transistor T, balancing the I-V curve shift of the drive transistor T and improving the threshold drift of the drive transistor T; within the next effective pulse overlapping duration between the third scan signal s3 and the fourth scan signal s4, due to the bias adjustment effect on the drive transistor T within the previous effective pulse overlapping duration, that drive transistor T approaches to the non-bias state, and at this point, the data signal Vdata is written to the gate of the drive transistor T again to ensure the accurate writing of the data signal Vdata so that the light-emitting element D can be driven to accurately emit light when the drive transistor T provides a drive current for the light-emitting element D according to the gate potential of the drive transistor T, thereby improving the display uniformity of the display panel.

It is to be noted that illustratively, the duration of the effective pulse of the third scan signal s3 is overlapped with durations of two effective pulses of the fourth scan signal s4. In the embodiments of the present disclosure, the duration of the effective pulse of the third scan signal s3 may also be overlapped with durations of more than two (for example, three, four or five) effective pulses of the fourth scan signal s4 in the same pixel circuit, and the embodiments of the present disclosure do not specifically limit the number of the preceding effective pulses of the fourth scan signal s4 as long as the core invention point of the embodiments of the present disclosure can be achieved. For ease of description, unless otherwise specified, the technical solutions in the embodiments of the present disclosure are illustrated through the example in which the duration of the effective pulse of the third scan signal is overlapped with durations of two effective pulses of the fourth scan signal in the same pixel circuit.

Optionally, with continued reference to FIGS. 3 and 21, in the same pixel circuit P, durations (t21) of part of the effective pulses of the fourth scan signal s4 are between durations (t21 and t22) of adjacent two effective pulses of the second scan signal s2.

The setting that durations of part of the effective pulses of the fourth scan signal s4 are between durations of adjacent two effective pulses of the second scan signal s2 may be understood as follows: durations of part of the effective pulses of the fourth scan signal s4 are between durations of adjacent two effective pulses of the second scan signal s2 and durations of part of the effective pulses of the fourth scan signal s4 are not between durations of adjacent two effective pulses of the second scan signal s2. In an optional embodiment, durations of part of the effective pulses of the fourth scan signal s4 may also be after the durations of the effective pulses of the second scan signal s2 or the duration of the effective pulse of the first scan signal s1.

For example, the following is described using an example in which in each drive cycle of the pixel circuit P, the second scan signal s2 and the fourth scan signal s4 each have two effective pulses, the duration (t21 and t22) of each effective pulse of the second scan signal s2 is overlapped with the duration t10 of the effective pulse of the first scan signal s1, and the duration (t41 and t42) of each effective pulse of the fourth scan signal s4 is overlapped with the duration t30' of the effective pulse of the third scan signal s3. At this point, the duration t41 of the first one effective pulse of the fourth scan signal s4 is between the durations t21 and t22 of the two effective pulses of the second scan signal s2. The gate of the drive transistor T may be reset within the duration t21 of the first one effective pulse of the second scan signal s2 so that the drive transistor T is on to ensure that the data signal Vdata is transmitted to the first electrode, the second electrode and the gate of the drive transistor T sequentially within the duration t41 of the first one effective pulse of the fourth scan signal s4 and keep the potentials of the first electrode, the second electrode and the gate of the drive transistor T consistent, thereby achieving the bias adjustment of the drive transistor T. After the duration t41 of the first one effective pulse of the fourth scan signal s4, within the duration t22 of the second one effective pulse of the second scan signal s2, the gate of the drive transistor T can be reset again so that the gate potential of the drive transistor T is cleared to ensure that the data signal Vdata can be accurately transmitted to the gate of the drive transistor T within the duration t42 of the second one effective pulse of the fourth scan signal s4 and enable the drive transistor T to accurately drive the light-emitting element D to emit light according to the gate potential of the drive transistor T in the subsequent light emission phase t40.

Figure 22:
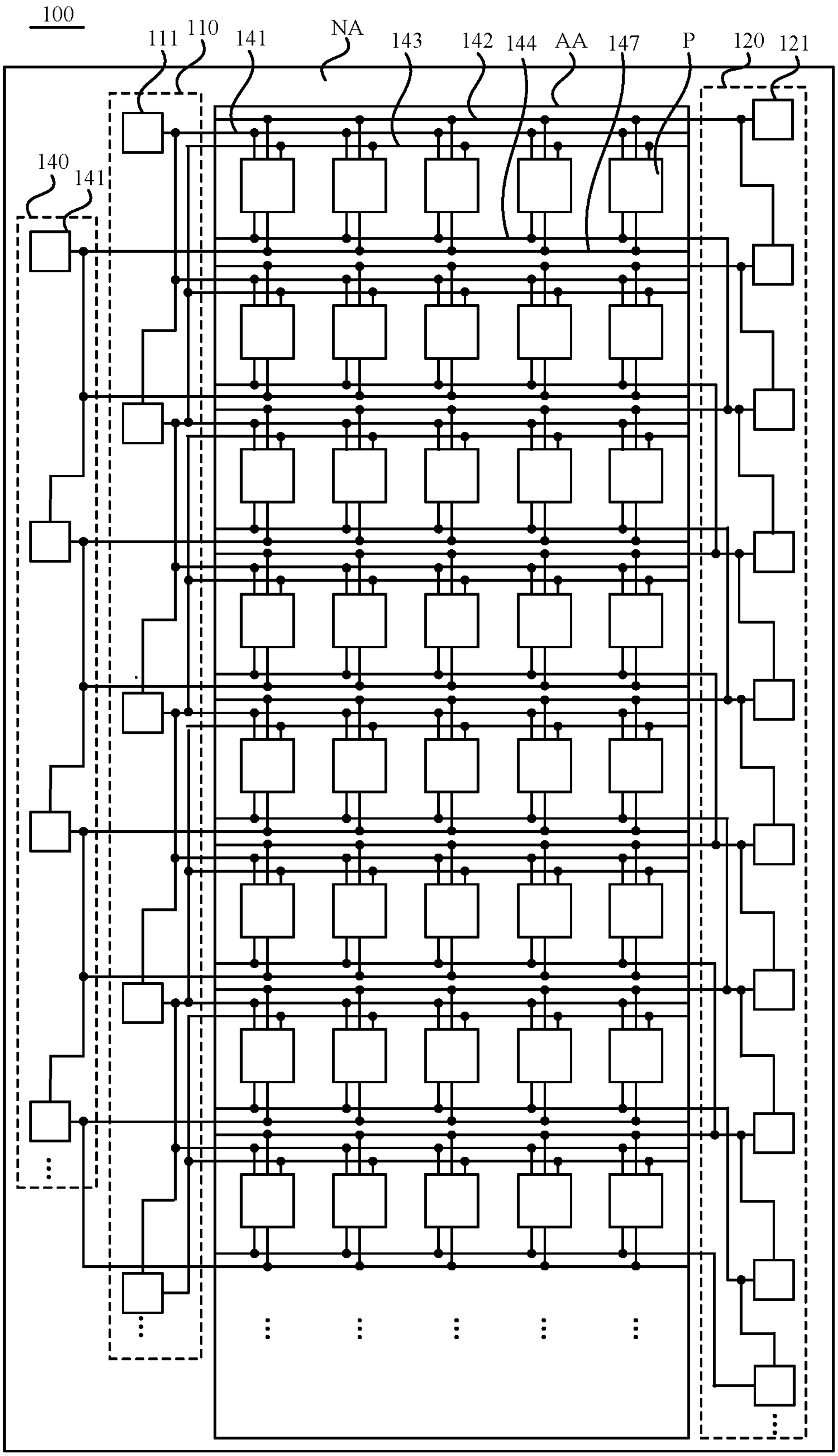
FIG. 22 is yet another structure diagram of a display panel according to an embodiment of the present disclosure.

Optionally, FIG. 22 is yet another structure diagram of a display panel according to an embodiment of the present disclosure. With reference to FIGS. 3 and 22, when the channel type of the data write transistor M2 is the same as the channel type of the second reset transistor M12, the display area AA may include a plurality of first scan lines 141, a plurality of second scan lines 142 and a plurality of fourth scan lines 144. First scan terminals S1 of at least part of pixel circuits Pin the same row are electrically connected to the same first scan line 141, second scan terminals S2 of at least part of pixel circuits P in the same row are electrically connected to the same second scan line 142, and fourth scan terminals S4 of at least part of the pixel circuits P in the same row are electrically connected to the same fourth scan line 144. Accordingly, the non-display area NA of the display panel 100 includes a first scan circuit 110 and a second scan circuit 120. The first scan circuit 110 includes a plurality of cascaded first scan units 111, and the second scan circuit 120 includes a plurality of cascaded second scan units 121.

Each stage of first scan unit 111 is electrically connected to adjacent N first scan lines 141, where N is a positive integer greater than or equal to 2. In this manner, the number of the first scan units 111 can be reduced, thereby achieving the narrow bezel of the display panel 100. Each stage of first scan unit 111 is used for providing the first scan signal s1 for each first scan line 141. The effective pulse of the first scan signal s1 outputted by each stage of first scan unit 111 is sequentially shifted, and the shift amount of the effective pulse of the first scan signal s1 is less than the width of the effective pulse of the first scan signal s1. In this manner, the scan duration in which the first scan circuit 110 scans each pixel circuit P can be shortened while the progressive scanning of each pixel circuit P can be achieved.

In an optional embodiment, the display area AA of the display panel 100 may further include a plurality of third scan lines 143, and the third scan terminals S3 of at least part of pixel circuits P in the same row are electrically connected to the same third scan line 143. The first scan unit 111 may also be electrically connected to adjacent N third scan lines 143, and the first scan terminal S1 and the third scan terminal S3 of the same pixel circuit P are electrically connected to adjacent two stages of first scan units 111 respectively so that the first scan unit 111 can also provide the third scan signal s3 for each pixel circuit P. At this point, the first scan circuit 110 which provides the first scan signal s1 for the pixel circuit P can be reused as the scan circuit which provides the third scan signal s3 for the pixel circuit P, thereby reducing the number of scan circuits set in the non-display area NA and achieving the narrow bezel of the display panel 100.

With continued reference to FIGS. 3 and 22, each stage of second scan unit 121 is electrically connected to a respective one of the plurality of second scan lines 142 and a respective one of the plurality of fourth scan lines 144, and two stages of second scan units 121 corresponding to the second scan line 142 and the fourth scan line 144 electrically connected to the same pixel circuit P are an $i^{th}$ stage of second scan unit 121 and an $(i+N)^{th}$ stage of second scan unit 121, respectively. The effective pulse of the second scan signal s2 outputted by each stage of second scan unit 121 and/or the effective pulse of the fourth scan signal s4 outputted by each stage of second scan unit 121 are sequentially shifted, and the shift amount of the effective pulse of the second scan signal s2 and/or the shift amount of the effective pulse of the fourth scan signal s4 are greater than or equal to the width of the effective pulse of the second scan signal s2.

Figure 23:
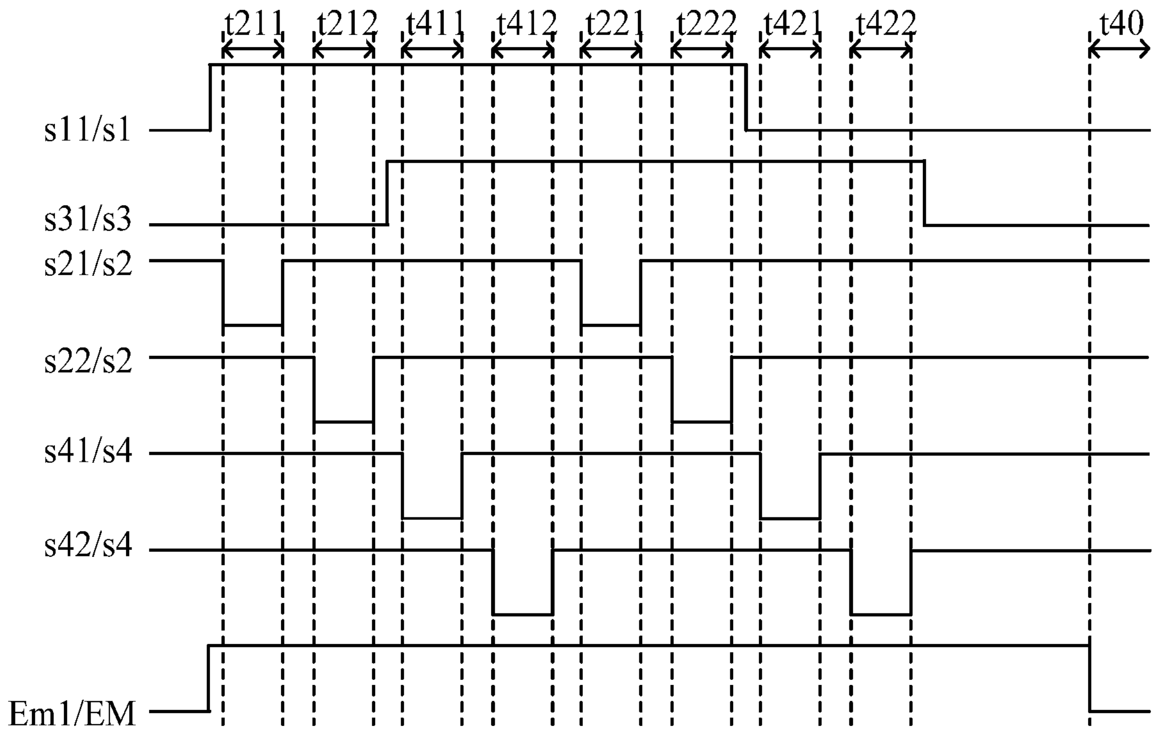
FIG. 23 is yet another drive timing diagram of each pixel circuit in a display panel according to an embodiment of the present disclosure.

For example, FIG. 23 is yet another drive timing diagram of each pixel circuit in a display panel according to an embodiment of the present disclosure. The following is described using an example in which N is equal to 2. With reference to FIGS. 3, 22 and 23, when each pixel circuit P in the same row is electrically connected to the same first scan line 141, the same second scan line 142, the same third scan line 143 and the same fourth scan line 144, respectively, the first stage of first scan unit 111 is electrically connected to the first scan terminals S1 of pixel circuits P in the first and second rows through two first scan lines 141, respectively. The second stage of first scan unit 111 is electrically connected to the first scan terminals S1 of pixel circuits Pin the third and fourth rows through two first scan lines 141, respectively, and is also electrically connected to the third scan terminals S3 of pixel circuits P in the first and second rows through two third scan lines 143, respectively. Similarly, the last stage of first scan unit 111 is electrically connected to the first scan terminals S1 of pixel circuits P in the last two rows through two first scan lines 141, respectively. The second scan terminals S2 of pixel circuits P in the first row are electrically connected to the first stage of second scan unit 121 through one second scan line 142. The second scan terminals S2 of pixel circuits P in the second row are electrically connected to the second stage of second scan unit 121 through one second scan line 142. Similarly, the second scan terminals S2 of pixel circuits P in the last row are electrically connected to the second last stage of second scan unit 121 through one second scan line 142. The fourth scan terminals S4 of pixel circuits P in the first row are electrically connected to the third stage of second scan unit 121 through one fourth scan line 144. The fourth scan terminals S4 of pixel circuits P in the second row are electrically connected to the fourth stage of second scan unit 121 through one fourth scan line 144. Similarly, the fourth scan terminals S4 of pixel circuits P in the last row are electrically connected to the last stage of second scan unit 121 through one fourth scan line 144.

The following is described using an example of the drive progress of pixel circuits P in the first and second rows. Within the overlapping duration t211 between the effective pulse of the first scan signal s11 outputted by the first stage of first scan unit 111 and the first one effective pulse of the second scan signal s21 outputted by the first stage of second scan unit 121, the first reset transistor M11 and the second reset transistor M12 of each pixel circuit P in the first row are simultaneously on so that the drive transistor T of each pixel circuit P in the first row can be reset. Within the overlapping duration t212 between the effective pulse of the first scan signal s11 outputted by the first stage of first scan unit 111 and the first one effective pulse of the second scan signal s22 outputted by the second stage of second scan unit 121, the first reset transistor M11 and the second reset transistor M12 of each pixel circuit P in the second row are simultaneously on so that the drive transistor T of each pixel circuit P in the second row can be reset. Within the overlapping duration t411 between the effective pulse of the third scan signal s31 outputted by the second stage of first scan unit 111 and the first one effective pulse of the fourth scan signal s41 outputted by the third stage of second scan unit 121, the data write transistor M2 and the first reset compensation transistor M31 of each pixel circuit P in the first row are simultaneously on so that the data signal Vdata can be provided for the first electrode, the second electrode and the gate of the drive transistor T of each pixel circuit P in the first row to achieve the bias adjustment of the drive transistor T. Within the overlapping duration t412 between the effective pulse of the third scan signal s31 outputted by the second stage of first scan unit 111 and the first one effective pulse of the fourth scan signal s42 outputted by the fourth stage of second scan unit 121, the data write transistor M2 and the first reset compensation transistor M31 of each pixel circuit P in the second row are simultaneously on so that the data signal Vdata can be provided for the first electrode, the second electrode and the gate of the drive transistor T of each pixel circuit P in the second row to achieve the bias adjustment of the drive transistor T. Within the overlapping duration t221 between the effective pulse of the first scan signal s11 outputted by the first stage of first scan unit 111 and the second one effective pulse of the second scan signal s21 outputted by the first stage of second scan unit 121, the first reset transistor M11 and the second reset transistor M12 of each pixel circuit P in the first row are on again so that the drive transistor T of each pixel circuit P in the first row can be reset again. Within the overlapping duration t222 between the effective pulse of the first scan signal s11 outputted by the first stage of first scan unit 111 and the second one effective pulse of the second scan signal s22 outputted by the second stage of second scan unit 121, the first reset transistor M11 and the second reset transistor M12 of each pixel circuit P in the second row are on again so that the drive transistor T of each pixel circuit P in the second row can be reset again. Within the overlapping duration t421 between the effective pulse of the third scan signal s31 outputted by the second stage of first scan unit 111 and the second one effective pulse of the fourth scan signal s41 outputted by the third stage of second scan unit 121, the data write transistor M2 and the first reset compensation transistor M31 of each pixel circuit P in the first row are on again so that the data signal Vdata corresponding to each pixel circuit P in the first row can be accurately written to the gate of the drive transistor T of each pixel circuit P. Within the overlapping duration t422 between the effective pulse of the third scan signal s31 outputted by the second stage of first scan unit 111 and the second one effective pulse of the fourth scan signal s42 outputted by the fourth stage of second scan unit 121, the data write transistor M2 and the first reset compensation transistor M31 of each pixel circuit P in the second row are on again so that the data signal Vdata corresponding to each pixel circuit P in the second row can be accurately written to the gate of the drive transistor T of each pixel circuit P. After each pixel circuit in the first and second rows is reset twice and the data signal Vdata is written to each pixel circuit in the first and second rows twice, the light emission phases t40 of the pixel circuits P in the two rows can simultaneously start, and the light-emitting elements D of the pixel circuits P in the two rows are driven to emit light.

In this manner, the reset phase and the write phase of each row of pixel circuits P can be performed at different times without affecting each other, thereby achieving the accurate writing of the data signal to each pixel circuit P, reducing the number of scan circuits and scan units set in the display panel 100 and achieving the narrow bezel of the display panel 100.

Figure 24:
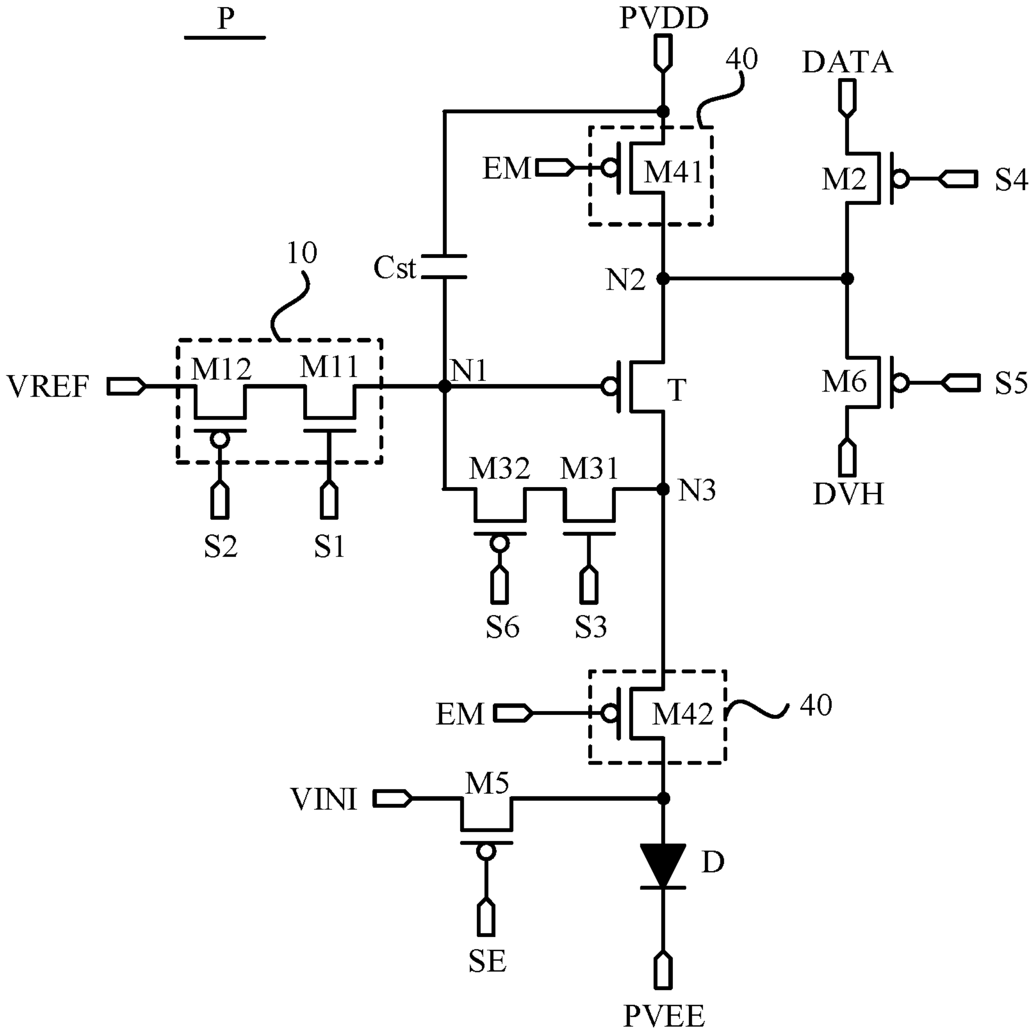
FIG. 24 is yet another structure diagram of a pixel circuit in a display panel according to an embodiment of the present disclosure.

Optionally, FIG. 24 is yet another structure diagram of a pixel circuit in a display panel according to an embodiment of the present disclosure. As shown in FIG. 24, each pixel circuit P further includes a second compensation transistor M32. The gate of the second compensation transistor M32 is electrically connected to a sixth scan terminal S6. The second compensation transistor M32 is electrically connected between the second electrode of the drive transistor T and the first electrode of the first compensation transistor M31. In the same pixel circuit P, durations of at least part of effective pulses of the sixth scan signal s6 of the sixth scan terminal S6 are overlapped with the duration of the effective pulse of the third scan signal s3 of the third scan terminal S3, and durations of at least part of the effective pulses of the sixth scan signal s6 are overlapped with durations of at least part of effective pulses of the fourth scan signal s4.

Since the second compensation transistor M32 is electrically connected between the first compensation transistor M31 and the gate of the drive transistor T, the signal at the third node N3 can be transmitted to the gate of the drive transistor T only when the second compensation transistor M32 and the first compensation transistor M31 are simultaneously in the on state. In this manner, in the writ phase of the data signal Vdata, the data write transistor M2, the first compensation transistor M31 and the second compensation transistor M32 can be controlled to be simultaneously on so that the data signal Vdata of the DATA signal terminal DATA can be transmitted to the gate of the drive transistor T through the data write transistor M2, the drive transistor T, the first compensation transistor M31 and the second compensation transistor M32 that are all on.

Figure 25:
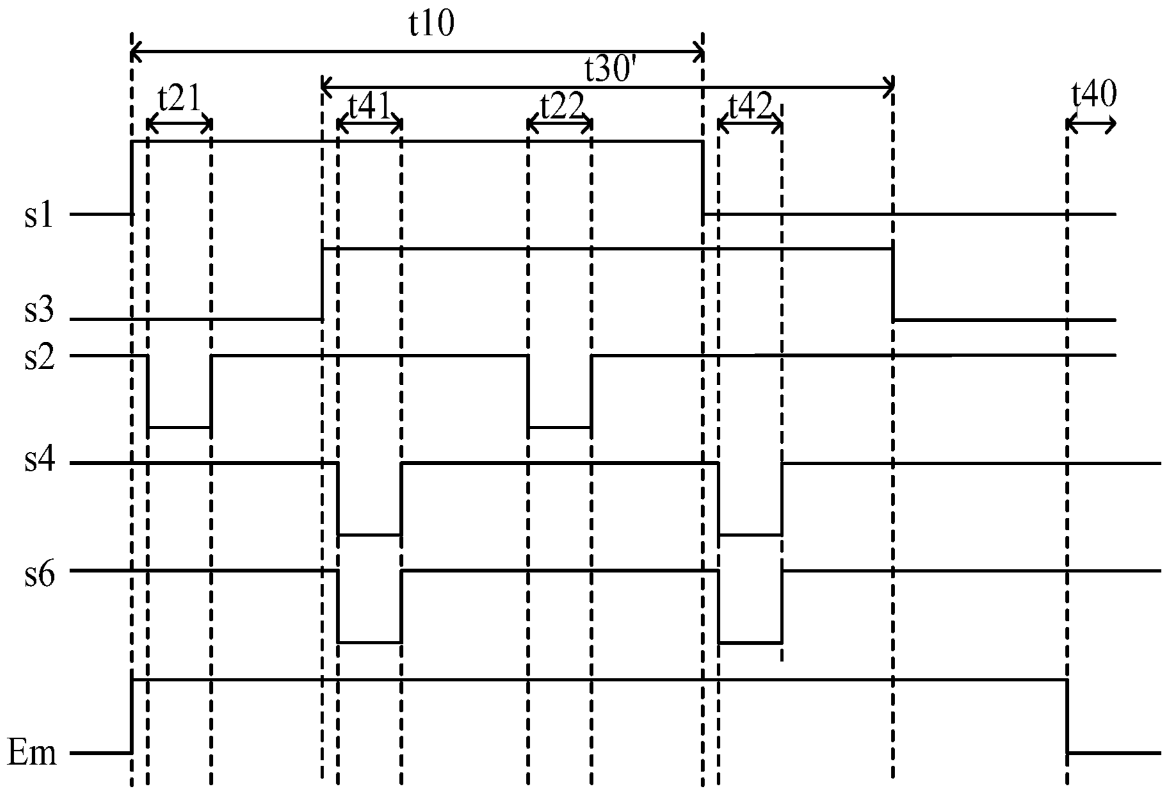
FIG. 25 is yet another drive timing diagram of a pixel circuit according to an embodiment of the present disclosure.

In an optional embodiment, FIG. 25 is yet another drive timing diagram of a pixel circuit according to an embodiment of the present disclosure. With reference to FIGS. 24 and 25, in each drive cycle of the pixel circuit P, the fourth scan signal s4 and the sixth scan signal s6 may each include at least two effective pulses. The following is described using an example in which the fourth scan signal s4 and the sixth scan signal s6 each include two effective pulses. The data signal Vdata can be written at least twice within the overlapping durations between the duration t30' of the effective pulse of the third scan signal s3 and durations (t41 and t42) of the effective pulses of the fourth scan signal s4 and the sixth scan signal s6, thereby improving the accuracy of the written data signal Vdata. In this manner, when the duration of the effective pulse of the third scan signal s3 is long, the writing duration of the data signal Vdata can be controlled by controlling the durations of the effective pulses of the fourth scan signal s4 and the sixth scan signal s6, respectively.

It is to be understood that the setting that the second compensation transistor M32 is electrically connected between the drive transistor T and the first compensation transistor M31 may be: the first electrode of the first compensation transistor M31 is electrically connected to the second electrode of the drive transistor T at the third node N3, the second electrode of the first compensation transistor M31 is electrically connected to the first electrode of the second compensation transistor M32, and the second electrode of the second compensation transistor M32 is electrically connected to the gate of the drive transistor T. In this manner, the first compensation transistor M31 and the second compensation transistor M32 can be connected in series.

Figure 26:
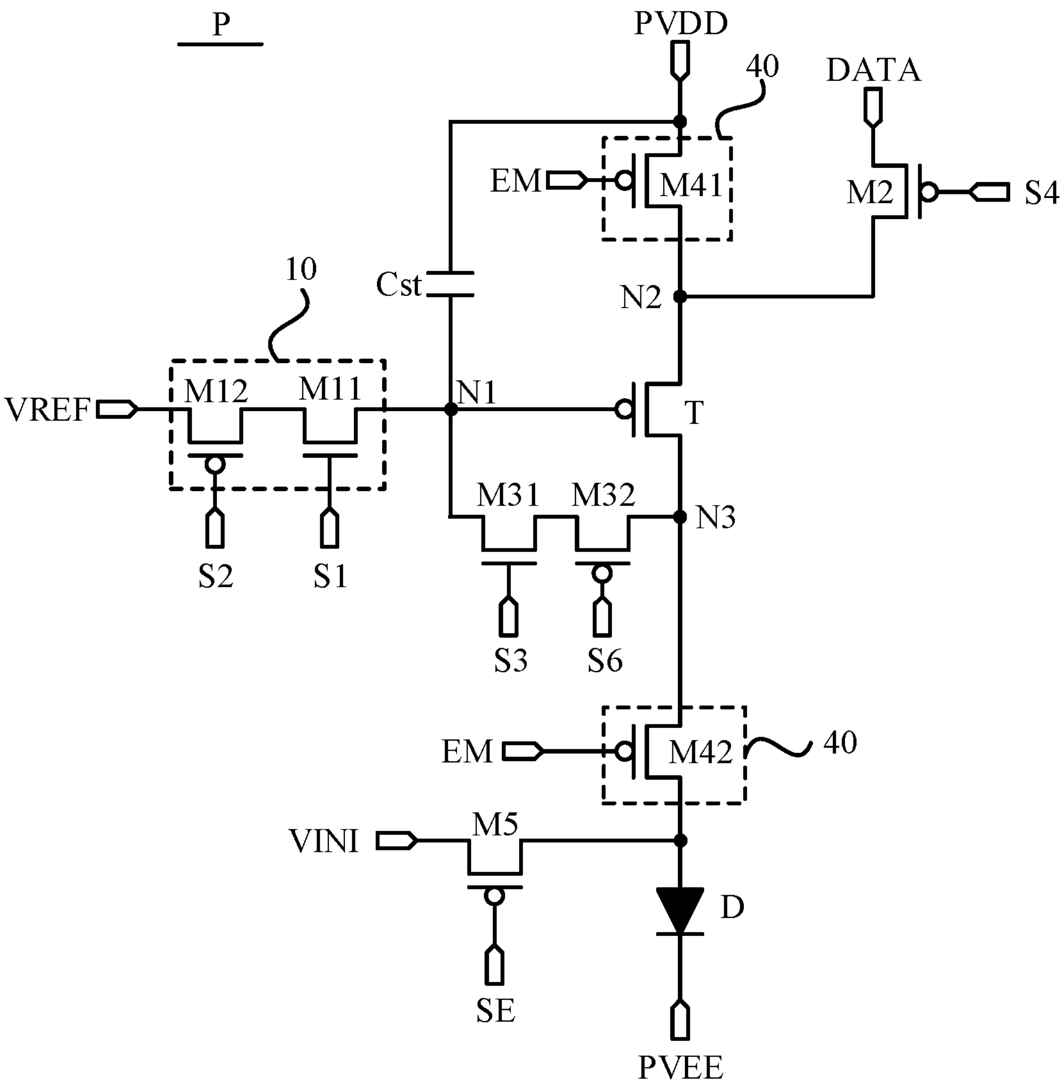
FIG. 26 is yet another structure diagram of a pixel circuit in a display panel according to an embodiment of the present disclosure.

In other optional embodiments, as shown in FIG. 26, the second compensation transistor M32 may also be electrically connected between the second electrode of the first compensation transistor M31 and the second electrode of the drive transistor T. At this point, the first electrode of the second compensation transistor M32 is electrically connected to the second electrode of the drive transistor T at the third node N3, the second electrode of the second compensation transistor M32 is electrically connected to the first electrode of the first compensation transistor M31, and the second electrode of the first compensation transistor M31 is electrically connected to the gate of the drive transistor T. In this manner, the series connection of the first compensation transistor M31 and the second compensation transistor M32 can also be achieved.

It is to be noted that the connection manners shown in FIGS. 24 and 26 are only two example connection manners in the embodiments of the present disclosure. The drive processes corresponding to the two connection manners are similar and both can enable the data signal Vdata to be written by controlling the first compensation transistor M31, the second compensation transistor M32 and the data write transistor M2 to be on. For ease of description, the following is illustrated with the description in FIG. 25 as an example.

It is to be understood that the channel types of the first compensation transistor M31 and the second compensation transistor M32 may be the same or different. When the channel types of the first compensation transistor M31 and the second compensation transistor M32 are the same, for example, the first compensation transistor M31 and the second compensation transistor M32 are both N-channel transistors or both P-channel transistors. When the channel type of the first compensation transistor M31 is different from the channel type of the second compensation transistor M32, the first compensation transistor M31 is an N-channel transistor and the second compensation transistor M32 is a P-channel transistor, or the first compensation transistor M31 is a P-channel transistor and the second compensation transistor M32 is an N-channel transistor.

For example, the following is described using an example in which the first compensation transistor M31 is an N-channel transistor and the second compensation transistor M32 is a P-channel transistor. When the third scan signal s3 is at a high level and the sixth scan signal s6 is at a low level, the first compensation transistor M31 and the second compensation transistor M32 are simultaneously on. Conversely, when the third scan signal s3 is at a low level, the first compensation transistor M31 is off, and when the sixth scan signal s6 is at a high level, the second compensation transistor M32 is off. Therefore, the duration in which the third scan signal s3 is at a high level is the duration of the effective pulse of the third scan signal, and the duration in which the sixth scan signal s6 is at a low level is the duration of the effective pulse of the sixth scan signal s6.

In an optional embodiment, with reference to FIGS. 25 and 26, when the channel types of the data write transistor M2 and the second compensation transistor M32 are the same, the fourth scan terminal S4 may be reused as the sixth scan terminal S6.

Specifically, when the fourth scan terminal S4 is reused as the sixth scan terminal S6, the fourth scan signal s4 provided for the fourth scan terminal S4 can control the data write transistor M2 and the second compensation transistor M32 to be on or off simultaneously to provide a path for writing the data signal Vdata when the data write transistor M2 and the second compensation transistor M32 are simultaneously on. Therefore, when the fourth scan terminal S4 is set to be reused as the sixth scan terminal S6, the number of scan terminals set in the pixel circuit P can be reduced, the structure of the pixel circuit P can be simplified, and the size occupied by the pixel circuit P and its corresponding scan lines in the display area can be reduced, thereby improving the resolution of the display panel. Further, when the fourth scan terminal S4 is set to be reused as the sixth scan terminal S6, the data write transistor M2 and the second compensation transistor M32 in the pixel circuit P can be controlled without the need of providing the fourth scan signal s4 and the sixth scan signal s6 for the pixel circuit P respectively, thereby reducing the number of scan signals provided for the pixel circuit P, reducing the number of scan circuits set in the non-display area and achieving the narrow bezel of the display panel.

Figure 27:
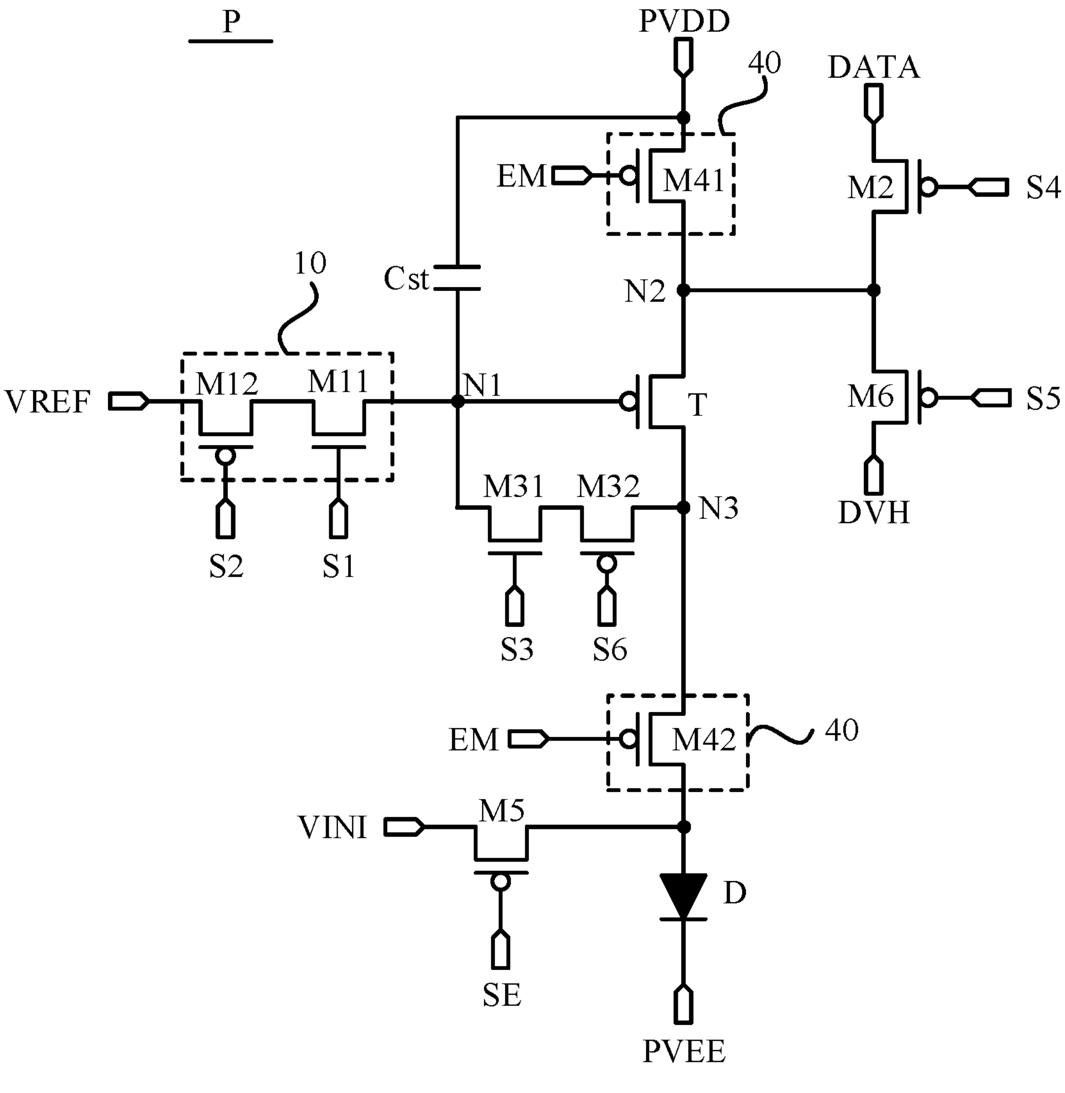
FIG. 27 is yet another structure diagram of a pixel circuit in a display panel according to an embodiment of the present disclosure.

In an optional embodiment, FIG. 27 is yet another structure diagram of a pixel circuit in a display panel according to an embodiment of the present disclosure. As shown in FIG. 27, when the pixel circuit P includes the second compensation transistor M32, the pixel circuit P may also include a bias adjustment transistor M6 electrically connected to the first electrode of the drive transistor T.

Figure 28:
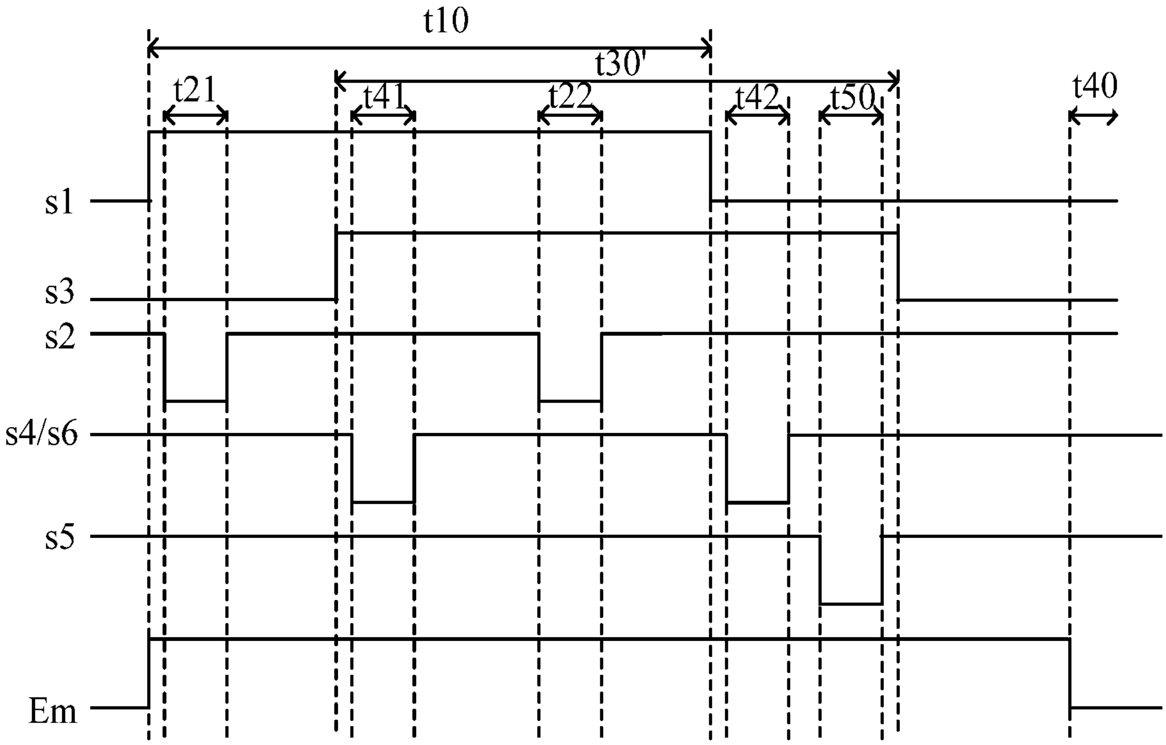
FIG. 28 is yet another drive timing diagram of a pixel circuit according to an embodiment of the present disclosure.

For example, FIG. 28 is yet another drive timing diagram of a pixel circuit according to an embodiment of the present disclosure. With reference to FIGS. 27 and 28, when the pixel circuit P includes both a bias adjustment transistor M6 and a second compensation transistor M32, at this point, the bias adjustment transistor M6 may enter the bias adjustment phase t50 after the write phase (t42) of the data signal Vdata is finished so that the bias adjustment signal Vpark is written to the first electrode (that is, the second node N2) of the drive transistor T to perform bias adjustment on the drive transistor T, thereby ensuring that the bias of the drive transistors T of each pixel circuit P is kept consistent before the light emission phase t40 starts and improving the display uniformity of the display panel.

It is to be understood that illustratively, the bias adjustment phase t50 is before the light emission phase t40 and after the write phase t42 of the last data signal Vdata. The embodiments of the present disclosure do not limit the specific duration of the bias adjustment phase t50 without affecting the core invention point of the embodiments of the present disclosure.

Based on the same inventive concept, an embodiment of the present disclosure further provides a display device. The display device includes the display panel provided in the embodiments of the present disclosure. Therefore, the display device has the technical features of the display panel provided in the embodiments of the present disclosure and the drive method thereof and can achieve the beneficial effects of the display panel provided in the embodiments of the present disclosure. For similarities between the display device and the display panel, reference may be made to the description of the display panel provided in the embodiments of the present disclosure, and the details are not repeated here.

Figure 29:
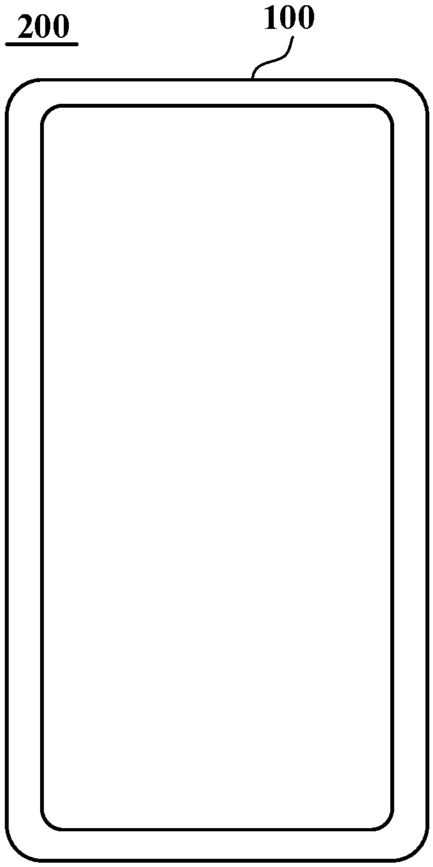
FIG. 29 is a structure diagram of a display device according to an embodiment of the present disclosure.

For example, FIG. 29 is a structure diagram of a display device according to an embodiment of the present disclosure. As shown in FIG. 29, the display device 200 includes the display panel 100 provided in the embodiments of the present disclosure. The display device 200 provided in the embodiments of the present disclosure may be any electronic product having a display function, including, but not limited to, the following categories: phones, televisions, laptops, desktop displays, tablet computers, digital cameras, smart bracelets, smart glasses, in-vehicle displays, medical equipment, and industrial control equipment, touch interactive terminals. The embodiments of the present disclosure do not specifically limit the category of the display device.

It is to be understood that various forms of the working processes of the pixel circuit shown above may be used with phases re-ordered, added, or removed. For example, the phases in the working processes of the pixel circuit described in the present disclosure may be performed in parallel, sequentially or in different orders, as long as the desirable results of the technical solutions of the present disclosure can be achieved, and no limitation is imposed herein.

The preceding embodiments do not limit the scope of the present disclosure. It is to be understood by those skilled in the art that various modifications, combinations, sub-combinations, and substitutions may be performed according to design requirements and other factors. Any modifications, equivalent substitutions, improvements and the like made within the spirit and principle of the present disclosure are within the scope of the present disclosure.

What is claimed is:

1. A display panel, comprising a display area, wherein the display area comprises a plurality of pixel circuits arranged in an array; a pixel circuit of the plurality of pixel circuits comprises a drive transistor and a reset module;

the reset module is electrically connected to a gate of the drive transistor at a first node;

the reset module comprises a first reset transistor and a second reset transistor; the first reset transistor and the second reset transistor are connected in series between a reset signal terminal and the first node; a gate of the first reset transistor is electrically connected to a first scan terminal, and a gate of the second reset transistor is electrically connected to a second scan terminal;

wherein a channel type of the first reset transistor is different from a channel type of the second reset transistor; a duration of an effective pulse of a first scan signal of the first scan terminal is overlapped with durations of at least two effective pulses of a second scan signal of the second scan terminal.

2. The display device according to claim 1, wherein in a same pixel circuit, a start time of the effective pulse of the first scan signal is before a start time of a first one effective pulse of the second scan signal, and an end time of the effective pulse of the first scan signal is after an end time of a last one effective pulse of the second scan signal.

3. The display panel according to claim 1, wherein the display area further comprises a plurality of first scan lines and a plurality of second scan lines; first scan terminals of at least part of pixel circuits in a same row are electrically connected to a same first scan line; second scan terminals of at least part of the pixel circuits in the same row are electrically connected to a same second scan line;

the display panel further comprises a non-display area surrounding the display area; the non-display area comprises a first scan circuit and a second scan circuit; the first scan circuit comprises a plurality of cascaded first scan units, and the second scan circuit comprises a plurality of cascaded second scan units;

each stage of first scan unit is electrically connected to adjacent N first scan lines; each stage of first scan unit is used for providing a first scan signal for each of the adjacent N first scan lines; an effective pulse of a first scan signal outputted by each stage of first scan unit is sequentially shifted, and a shift amount of the effective pulse of the first scan signal at each stage is less than a width of the effective pulse of the first scan signal; wherein N is a positive integer greater than or equal to 2;

each stage of second scan unit is electrically connected to a respective one of the plurality of second scan lines; an effective pulse of a second scan signal outputted by each stage of second scan unit is sequentially shifted, and a shift amount of the effective pulse of the second scan signal outputted by each stage of second scan unit is greater than or equal to a width of the effective pulse of the second scan signal.

4. The display panel according to claim 3, wherein an interval duration between start times of effective pulses of first scan signals outputted by adjacent two stages of first scan units is a first duration;

in successive N stages of second scan units, an effective pulse of a second scan signal outputted by each stage of second scan unit is sequentially shifted, and a duration of the effective pulse of the second scan signal outputted by each stage of second scan unit is not overlapped; a total duration of a first one effective pulse of the second scan signal outputted by each stage of second scan unit in the successive N stages of second scan units is a second duration;

wherein the first duration is greater than or equal to the second duration.

5. The display panel according to claim 1, wherein a first electrode of the second reset transistor is electrically connected to the reset signal terminal, and a second electrode of the second reset transistor is electrically connected to a first electrode of the first reset transistor; a second electrode of the first reset transistor is electrically connected at the first node; the first reset transistor is an N-channel transistor, and the second reset transistor is a P-channel transistor.

6. The display panel according to claim 1, wherein the pixel circuit further comprises a data write transistor and a first compensation transistor;

a gate of the first compensation transistor is electrically connected to a third scan terminal, a first electrode of the first compensation transistor is coupled to a second electrode of the drive transistor at a third node, and a second electrode of the first compensation transistor is coupled to the gate of the drive transistor at the first node;

a gate of the data write transistor is electrically connected to a fourth scan terminal, a first electrode of the data write transistor is connected to a data signal terminal, and a second electrode of the data write transistor is electrically connected to a first electrode of the drive transistor at a second node;

in a same pixel circuit, a duration of an effective pulse of a third scan signal of the third scan terminal is overlapped with a duration of an effective pulse of a fourth scan signal of the fourth scan terminal.

7. The display panel according to claim 6, wherein a channel type of the first compensation transistor is a same as the channel type of the first reset transistor;

the display area further comprises a plurality of first scan lines and a plurality of third scan lines; first scan terminals of at least part of pixel circuits in a same row are electrically connected to a same first scan line; third scan terminals of at least part of the pixel circuits in the same row are electrically connected to a same third scan line;

the display panel further comprises a non-display area; the non-display area comprises a first scan circuit; the first scan circuit comprises a plurality of cascaded first scan units; a first scan line and a third scan line electrically connected to a same pixel circuit are electrically connected to adjacent two stages of first scan units respectively, a first scan unit at a previous stage in the adjacent two stages of first scan units is electrically connected to the first scan line, and a first scan unit at a subsequent stage in the adjacent two stages of first scan units is electrically connected to the third scan line;

a first stage of first scan unit is electrically connected to N first scan lines, and a last stage of first scan unit is electrically connected to N third scan lines; each stage of first scan unit between the first stage of first scan unit and the last stage of first scan unit is electrically connected to adjacent N first scan lines and adjacent N third scan lines; wherein N is a positive integer greater than or equal to 2;

an effective pulse of a first scan signal outputted by each stage of first scan unit is sequentially shifted, and a shift amount of the effective pulse of the first scan signal is less than a width of the effective pulse of the first scan signal.

8. The display panel according to claim 7, wherein in each of pixel circuits electrically connected to a same first scan unit, an end time of a first one effective pulse of a second scan signal is before a start time of an effective pulse of a fourth scan signal.

9. The display panel according to claim 7, wherein in each of pixel circuits electrically connected to a same first scan unit, a start time of an effective pulse of a fourth scan signal is after an end time of an effective pulse of a first scan signal.

10. The display panel according to claim 7, wherein the display area further comprises a plurality of second scan lines and a plurality of fourth scan lines; second scan terminals of at least part of pixel circuits in a same row are electrically connected to a same second scan line; fourth scan terminals of at least part of the pixel circuits in the same row are electrically connected to a same fourth scan line;

the non-display area further comprises a second scan circuit and a third scan circuit; the second scan circuit comprises a plurality of cascaded second scan units, and the third scan circuit comprises a plurality of cascaded third scan units;

each stage of second scan unit is electrically connected to adjacent N second scan lines; an effective pulse of a second scan signal outputted by each stage of second scan unit is sequentially shifted, and a shift amount of the effective pulse of the second scan signal is greater than or equal to a width of the effective pulse of the second scan signal;

each stage of third scan unit is electrically connected to a respective one of plurality of fourth scan lines; an effective pulse of a fourth scan signal outputted by each stage of third scan unit is sequentially shifted, and a shift amount of the effective pulse of the fourth scan signal is greater than or equal to a width of the effective pulse of the fourth scan signal.

11. The display panel according to claim 10, wherein the width of the effective pulse of the second scan signal is greater than or equal to N times the width of the effective pulse of the fourth scan signal;

in a same pixel circuit, a duration of the effective pulse of the second scan signal is not overlapped with a duration of the effective pulse of the fourth scan signal.

12. The display panel according to claim 6, wherein in a same pixel circuit, the duration of the effective pulse of the third scan signal of the third scan terminal is overlapped with durations of at least two effective pulses of the fourth scan signal of the fourth scan terminal.

13. The display panel according to claim 12, wherein in the same pixel circuit, a duration of part of an effective pulse of the fourth scan signal is between durations of adjacent two effective pulses of a second scan signal.

14. The display panel according to claim 12, wherein a channel type of the data write transistor is a same as the channel type of the second reset transistor;

the display area further comprises a plurality of first scan lines, a plurality of third scan lines, and a plurality of fourth scan lines; first scan terminals of at least part of pixel circuits in a same row are electrically connected to a same first scan line, second scan terminals of at least part of pixel circuits in the same row are electrically connected to a same second scan line, and fourth scan terminals of at least part of the pixel circuits in the same row are electrically connected to a same fourth scan line;

the display panel further comprises a non-display area; the non-display area comprises a first scan circuit and a second scan circuit; the first scan circuit comprises a plurality of cascaded first scan units, and the second scan circuit comprises a plurality of cascaded second scan units;

each stage of first scan unit is electrically connected to adjacent N first scan lines; each stage of first scan unit is used for providing a first scan signal for each of the adjacent N first scan lines; an effective pulse of a first scan signal outputted by each stage of first scan unit is sequentially shifted, and a shift amount of the effective pulse of the first scan signal is less than a width of the effective pulse of the first scan signal; wherein N is a positive integer greater than or equal to 2;

each stage of second scan unit is electrically connected to a respective one of the plurality of second scan lines and a respective one of the plurality of fourth scan lines, and two stages of second scan units corresponding to a second scan line and a fourth scan line electrically connected to a same pixel circuit are an $i^{th}$ stage of second scan unit and an $(i+N)^{th}$ stage of second scan unit, respectively; an effective pulse of a second scan signal outputted by each stage of second scan unit and/or an effective pulse of a fourth scan signal outputted by each stage of second scan unit are sequentially shifted, and a shift amount of the effective pulse of at least one of the second scan signal or a shift amount of the effective pulse of the fourth scan signal are greater than or equal to a width of the effective pulse of the second scan signal.

15. The display panel according to claim 6, wherein each of the plurality of pixel circuits further comprises a bias adjustment transistor; a gate of the bias adjustment transistor is electrically connected to a fifth scan terminal, a first electrode of the bias adjustment transistor is electrically connected to a bias adjustment terminal, and a second electrode of the bias adjustment transistor is electrically connected to the first electrode of the drive transistor;

in the same pixel circuit, durations of at least part of effective pulses of a fifth scan signal of the fifth scan terminal are not overlapped with the duration of the effective pulse of the third scan signal, and durations of the effective pulses of the fifth scan signal are not overlapped with the duration of the effective pulse of the fourth scan signal.

16. The display panel according to claim 15, wherein part of the effective pulses of the fifth scan signal is a first effective pulse;

in the same pixel circuit, a duration of the first effective pulse of the fifth scan signal is overlapped with the duration of the effective pulse of the third scan signal, and the duration of the first effective pulse of the fifth scan signal is between durations of adjacent two effective pulses of a second scan signal.

17. The display panel according to claim 16, wherein the display area further comprises second scan lines and fifth scan lines; second scan terminals of at least part of pixel circuits in a same row are electrically connected to a same second scan line; fifth scan terminals of at least part of the pixel circuits in the same row are electrically connected to a same fifth scan line;

the display panel further comprises a non-display area; the non-display area further comprises a second scan circuit; the second scan circuit comprises a plurality of cascaded second scan units; a second scan line and a fifth scan line electrically connected to a same pixel circuit are electrically connected to adjacent two odd-numbered stages of second scan units respectively or are electrically connected to adjacent two even-numbered stages of second scan units respectively, a second scan unit at a previous stage in the adjacent two odd-numbered stages of second scan units or the adjacent two even-numbered stages of second scan units is electrically connected to the second scan line, and a second scan unit at a subsequent stage in the adjacent two odd-numbered stages of second scan units or the adjacent two even-numbered stages of second scan units is electrically connected to the fifth scan line;

an effective pulse of a second scan signal outputted by each stage of second scan unit is sequentially shifted, and a shift amount of the effective pulse of the second scan signal is greater than or equal to a width of the effective pulse of the second scan signal.

18. The display panel according to claim 17, wherein the second scan circuit comprises M stages of second scan units; a first stage of second scan unit and a second stage of second scan unit are electrically connected to adjacent N second scan lines respectively, and an $(M-1)^{th}$ stage of second scan unit and an $M^{th}$ stage of second scan unit are electrically connected to adjacent N fifth scan lines respectively; wherein M is an even number greater than or equal to 4, and N is a positive integer greater than or equal to 2;

each stage of second scan unit between the second stage of second scan unit and the $(M-1)^{th}$ stage of second scan unit is electrically connected to adjacent N second scan lines and adjacent N fifth scan lines.

19. The display panel according to claim 6, wherein each of the plurality of pixel circuits further comprises a second compensation transistor; a gate of the second compensation transistor is electrically connected to a sixth scan terminal;

the second compensation transistor is electrically connected between the second electrode of the drive transistor and the first electrode of the first compensation transistor, or the second compensation transistor is electrically connected between the second electrode of the first compensation transistor and the gate of the drive transistor;

in the same pixel circuit, durations of at least part of effective pulses of a sixth scan signal of the sixth scan terminal are overlapped with the duration of the effective pulse of the third scan signal of the third scan terminal, and durations of at least part of the effective pulses of the sixth scan signal are overlapped with durations of at least part of effective pulses of the fourth scan signal.

20. The display panel according to claim 19, wherein a channel type of the second compensation transistor is different from a channel type of the first compensation transistor.

21. The display panel according to claim 19, wherein the channel type of the second compensation transistor is a same as a channel type of the data write transistor;

wherein the fourth scan terminal is reused as the sixth scan terminal.

22. A display device, comprising the display panel according to claim 1.

* * * * *